(12) United States Patent  
Yoshikawa

(10) Patent No.: US 7,456,895 B2  
(45) Date of Patent: Nov. 25, 2008

(54) RELAY UNIT

(75) Inventor: Kazumasa Yoshikawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 738 days.

(21) Appl. No.: 10/806,684

(22) Filed: Mar. 22, 2004

(65) Prior Publication Data

US 2004/0189859 A1 Sep. 30, 2004

(30) Foreign Application Priority Data

Mar. 25, 2003 (JP) ............................. 2003-082788  
May 13, 2003 (JP) ............................. 2003-134510

(51) Int. Cl.
*H04N 5/232* (2006.01)
*G03B 13/00* (2006.01)

(52) U.S. Cl. .................. 348/345; 348/211.99
(58) Field of Classification Search ................ 348/345, 348/346, 357, 211.99, 211.4, 211.5
See application file for complete search history.

(56) References Cited

U.S. PATENT DOCUMENTS

| | | | |
|---|---|---|---|
| 4,029,917 A | 6/1977 | Webster | |
| 4,281,912 A | 8/1981 | Maida | |
| 4,556,907 A | 12/1985 | Urata | |
| 4,703,319 A | 10/1987 | Schine | |
| 4,763,154 A * | 8/1988 | Iguchi et al. .................. 396/99 |
| 5,517,236 A | 5/1996 | Sergeant | |
| 5,758,206 A | 5/1998 | Imaoka | |
| 5,884,107 A * | 3/1999 | Yajima ........................ 396/86 |
| 5,896,171 A * | 4/1999 | Suzuki .................. 348/211.14 |
| 6,219,098 B1 * | 4/2001 | Kawamura et al. .......... 348/335 |
| 6,330,648 B1 | 12/2001 | Wambach et al. | |
| 6,801,259 B2 * | 10/2004 | Senda ........................ 348/345 |
| 6,903,775 B2 * | 6/2005 | Senda ........................ 348/345 |

FOREIGN PATENT DOCUMENTS

| | | |
|---|---|---|
| EP | 0888002 A2 | 12/1988 |
| JP | 10-20845 A | 1/1998 |
| JP | 2000-91039 A | 3/2000 |

* cited by examiner

*Primary Examiner*—Justin P Misleh
(74) *Attorney, Agent, or Firm*—Canon U.S.A., Inc., IP Division

(57) ABSTRACT

A relay unit connected between a remote control unit and an optical device having a focus lens comprises a first switching signal input unit for switching control of the focus lens between automatic focal point detection focusing and control of the focus lens by remote commands from the remote control unit. This enables remote control of a lens unit simply by replacing the lens unit with one having automatic focus capabilities.

4 Claims, 13 Drawing Sheets

RELAY UNIT

BACKGROUND OF THE INVENTION

1. Field of the Invention

The present invention relates to relay units and more specifically to relay units for optical devices for use in television cameras, video cameras, television lens, video lens, or the like, which perform automatic focal point detection focus control (hereafter referred to as "AF control").

2. Description of the Related Art

In recent years, automatic focal point detection control (AF) control has become indispensable to picture-taking devices such as consumer-grade video cameras or the like. The AF control method extracts and evaluates signals corresponding to the sharpness of the subject from picture signals before automatic focal point detection is performed.

An example of operations of such an AF control system is described with reference to FIG. 6. In FIG. 6, reference numeral 600 denotes a camera with a non-detachable lens unit, 102 denotes evaluation value generating means for extracting a sharpness evaluation value from the picture signals output from later-described process means 202, and 103 denotes AF driving control means for generating motor control signals such that the sharpness evaluation value generated by the evaluation value generating means 102 is maximized. Reference numeral 105 denotes a motor operated under the control of the AF driving control means 103, and 106 denotes a focus lens which is driven along the optical axis by the motor 105. Reference numeral 201 denotes a CCD, 202 denotes process means for converting the output signals of the CCD into a picture format such as NTSC signals or the like, and 203 denotes recording/reproducing means for recording the picture signals, which are the output of the process means 202, on a recording medium, and reproducing the pictures recorded therein.

In the above-described configuration, the optical flux which has passed through the focus lens 106 is imaged on the imaging face of the CCD 201 for photoelectric conversion by the CCD. A held sample is then input to the process means 202, where input signals are converted into a picture format such as NTSC signals or the like, and output to the evaluation value generating means 102 and the recording/reproducing means 203. The evaluation value generating means 102 generates sharpness evaluation values for the picture signals output to the evaluation value generating means 102, the sharpness evaluation values relating to the frequency component of the picture being obtained by filter processing or the like and generated in increments of vertical synchronization cycles of the picture signals, and output to the AF driving control means 103. At the AF driving control means 103, motor control signals are generated which move the focus lens 106 to a position wherein the sharpness evaluation value is maximum, sequentially comparing the sharpness evaluation value in increments of vertical synchronization cycles while driving the motor 105, so that the focus lens 106 is moved to the focal point. The recording/reproducing means 203 records the output of the process means 202 in the recording medium, and also reproduce the pictures recorded therein.

An example of such AF driving will be described. The movement direction of the focus lens 106 is determined by moving the focus lens 106 by a small amount. That is, the focal point may either be at the far side of the near side of the current position of the focus lens 106 or the near side of the focus lens. By slightly moving the focus lens 106, and considering the change in the sharpness evaluation value, such movement direction is determined. Subsequently, the focus lens 106 is moved at a specific speed in order to detect the peak value of the sharpness evaluation value, following the results of determining the direction for driving. This is referred to as "hill-climbing determination". After exceeding the peak value, the direction of moving the focus lens 106 is reversed, and the focus lens 106 is guided in increments of minute amounts of movement so that the sharpness evaluation value is maximized. This is referred to as "peak determination". Following the peak determination, the sharpness evaluation value is read and compared with the value immediately following the peak determination, and the value has changed, the AF operations are reactivated.

The video AF actions of a camera system having such an exchangeable lens configuration is described in detail in Japanese Unexamined Patent Application Publication No. 9-065184.

Also, "remote systems" are known for monitoring and/or taking pictures of ceremonies or other solemn services or gatherings, etc., by using television cameras, video cameras, television lenses, video lenses, and so forth. Such remote systems are not equipped with AF control, and thus require an operator to operate switches and dials to perform functions such as zooming, iris control, focus, and so forth.

A remote system uses a 12-pin electric interface between the remote control unit and the camera. The electric interface has pins assigned to zoom, iris, and focus command signals, control mode signals (switching between speed control and position control), electric power source, ground, and so forth. In may such remote systems, all 12 pins are in use, i.e., there are no more pins available.

An example of operations of this remote system is described with reference to FIG. 7. The components in FIG. 7 denoted by the reference numerals 105, 106, 201, 202, and 203, in FIG. 6, have already been described above, and accordingly description thereof will be omitted here.

In FIG. 7, reference numeral 100 denotes an exchangeable lens unit, 200 denotes a camera unit, and 400 denotes a remote control unit for supplying to the lens unit 100: command signals for controlling an unshown zoom lens unit, iris unit, and focus lens 106; and switching signals for switching between either speed control or positional control to control the unshown zoom lens unit, iris unit, and focus lens 106. Reference numeral 500 denotes a remote control cable connecting the lens unit 100 and the remote control unit 400.

In the lens unit 100, reference numeral 107 denotes a remote control input terminal for inputting to the lens unit 100 the command signals and switching signals from the remote control unit 400, 109 denotes MF driving control means for generating motor control signals for driving a motor 105 from manual focus command signals (hereafter referred to as "MF command signals") input from the remote control unit 400, and 211 denotes S/P (Speed/Positional) switching signal determining means for outputting S/P switching command signals to the MF driving control means to control the focus lens 106 with either speed control or positional control, based on S/P switching signals output from S/P switching signal input means 402.

In the remote control unit 400, reference numeral 401 denotes MF command signal generating means comprising switches and dials and the like for generating MF command signals, 402 denotes S/P switching signal input means to switch between control of the focus lens 106 with either speed control or positional control, and 403 denotes a remote control output terminal for outputting the MF command signals and S/P switching signals from the remote control unit 400 to the lens unit 100.

In the above-described configuration, operating the MF command signal generating means 401 causes MF command signals proportionate to the operations thereof to be output, and input to the MF driving control means 109 via the remote control input terminal 107. Also, S/P switching signals for switching between speed or positional control of focus lens 106 are output at the S/P switching signal input means 702, and input to the S/P switching signal determining means 211 via the remote control output terminal 403, the remote control cable 500, and the remote control input terminal 107. At the S/P switching signal determining means 211, determination is made regarding whether to control the focus lens 106 with speed control or with positional control, and the determination results are output to the MF driving control means 109 as S/P switching command signals. At the MF driving control means 109, in the event that the S/P switching command signals are for controlling the focus lens 106 with speed control, the MF command signals are handled as speed control commands signals, motor control signals are generated for driving the motor 105 at a speed commanded by the MF command signals, and the motor 105 is driven so as to move the focus lens 106. On the other hand, in the event that the S/P switching command signals are for controlling the focus lens 106 with positional control, the MF command signals are handled as positional control commands signals, motor control signals are generated for driving the motor 105 to the position commanded by the MF command signals, and the motor 105 is driven so as to move the focus lens 106.

However, with the above-described conventional example, in the event that the remote system has AF control, simply replacing the lens unit 100 with a lens unit capable of handling AF control does not provide the remote control unit 400 (which also enables remote operations of the lens unit 100) with switching means to determine whether the focus lens 106 is to be driven by AF control or MF control.

Also, with the remote system, there are no pins available in the electric interface between the remote control unit 400 and the lens unit 100, so pins cannot be assigned to switching signals to drive the focus lens 106 either by AF control or by MF control from the remote control unit 400.

SUMMARY OF THE INVENTION

The present invention has been made in light of the above-described problems, and accordingly, it is a first object of the present invention to provide a remote system with AF control. This AF control enables switching between AF or MF control of the focus lens 106. the AF control unit is provided on the side of the remote control unit 400, which enables remote operations of the lens unit 100 simply by replacing the lens unit 100 with an AF control device. This allows switching between AF or MF of the focus lens 106 despite the non-availability of pins in the electric interface between the remote control unit and the optical device.

According to a first aspect of the present invention, a relay unit connected between a remote control unit and an optical device having a focus lens is provided. The relay control unit comprises first switching signal input means for switching control of the focus lens between either an automatic focal point detection control or remote control from the remote control unit.

According to this arrangement, a remote system with AF control is provided which has a switching means for switching between AF control and MF control of the focal lens.

According to another aspect of the present invention, an optical device comprises: focal point detection focus control means for controlling a focus lens by automatic focal point detection focus control; and switching signal input means for switching between whether to control the focus lens by automatic focal point detection focus control or to control the focus lens by remote command control from remote command control means disposed outside of the optical device.

According to another aspect, a relay unit locatable between a remote control unit and an optical device having a focus lens is provided. The relay unit includes a first switching signal input means for switching control of said focus lens between an automatic focal point detection focus control means and a remote control unit. The automatic focal point detection focus control means performs automatic focal point detection focusing and the remote control unit provides remote commands to control the focus lens.

According to another aspect, a relay unit having an input terminal for receiving a manual focus command signal and a speed/position switching signal is provided. These signals may emanate from a remote control unit coupled to the relay unit, for example. The relay unit also has an output terminal for providing said manual focus command signal and said speed/position switching signal to a focus lens of an optical device. Another feature of the relay unit is that it has a switching signal input means for controlling the focus lens by switching between automatic focal point detection control and manual focus control of the focus lens.

This enables an arrangement wherein switching means for switching between whether to drive the focus lens with AF control or with MF control to be provided to a lens unit of a remote system with AF control even though there are no available pins in the electric interface between the remote control unit and the optical device, thereby making the remote system more useful.

Further objects, features and advantages of the present invention will become apparent from the following description of the preferred embodiments with reference to the attached drawings.

DESCRIPTION OF THE PREFERRED EMBODIMENTS

A description will now be made of embodiments of the present invention.

First Embodiment

Figure 1:
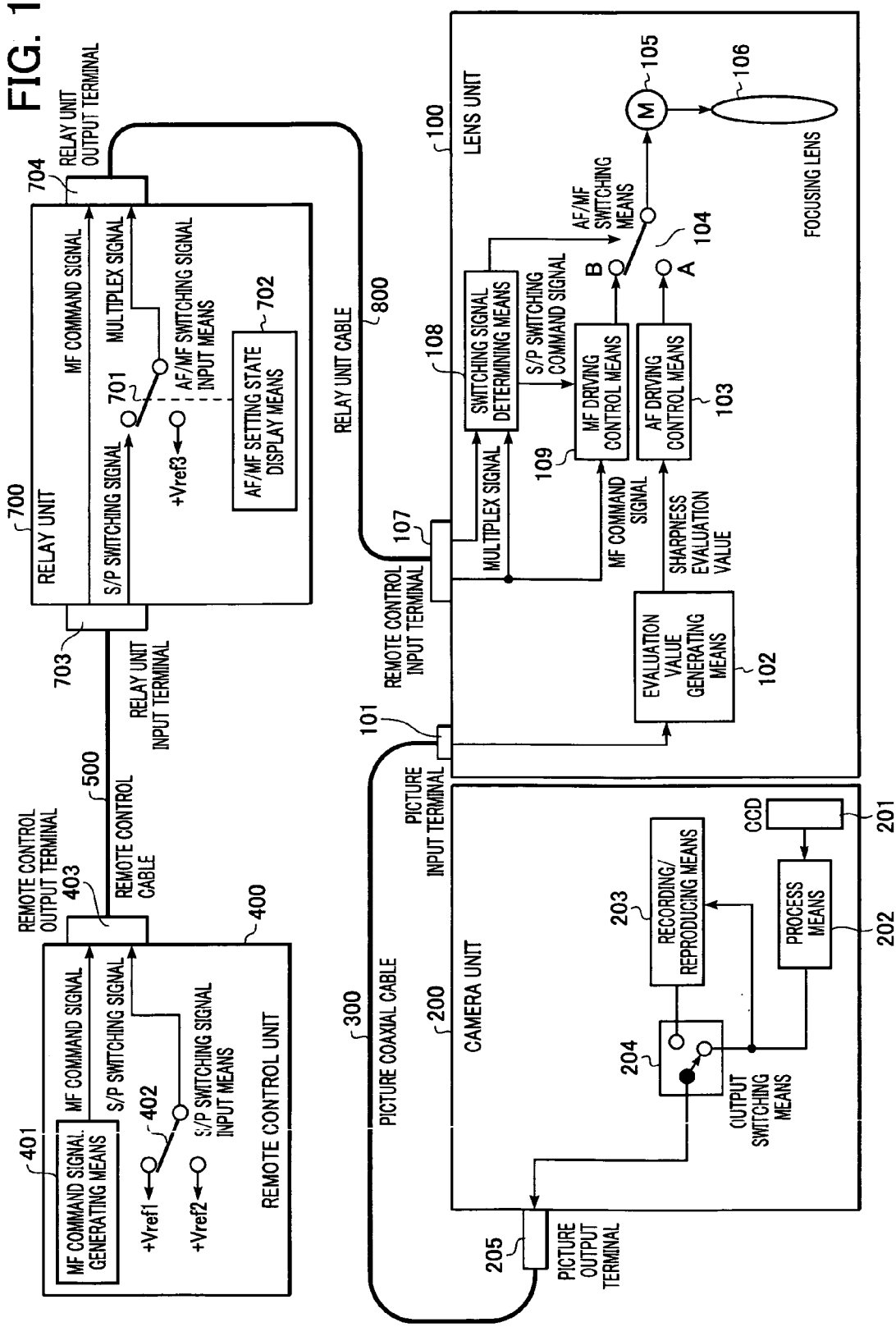
FIG. 1 is a block diagram of a first embodiment of the present invention.

A first embodiment of the present invention will now be described. FIG. 1 illustrates the configuration of an optical device to which the first embodiment of the present invention has been applied.

In FIG. 1, reference numeral 100 denotes an exchangeable lens unit, 200 denotes a camera unit, 300 denotes a picture coaxial cable. The reference numeral 400 denotes a remote control unit for supplying the lens unit 100 with control signals for controlling a zoom lens unit and iris unit (not shown), and focus lens 106 within the lens unit 100. The remote control unit 400 also supplies switching signals for switching between control of the zoom lens unit, iris unit, and focus lens 106 between speed control and positional control.

The reference numeral 500 denotes a remote control cable for connecting the remote control unit 400 with a relay unit 700, which in turn is situated between the remote control unit 400 and the lens unit 100 and multiplexes switching signals for switching control of the focus lens 106 between AF control or MF control upon S/P switching signals which are the output from S/P switching signal input means 402, and displays whether the focus lens 106 is being controlled with AF control or MF control, and 800 denotes a relay unit cable for connecting the relay unit 700 and the lens unit 100.

In the lens unit 100, reference numeral 101 denotes a picture input terminal for inputting picture signals via a picture coaxial cable 300, 102 denotes evaluation value generating means for extracting a sharpness evaluation value from the picture signals input from the picture input terminal 101, and 103 denotes AF driving control means for generating motor control signals such that the sharpness evaluation value generated by the evaluation value generating means 102 is maximized. Reference numeral 104 denotes AF/MF switching means controlled by switching signal determining means 108, for switching between whether to drive the later-described motor 105 with motor control signals from the AF driving control means 103 or with motor control signals from the MF driving control means 109, 105 denotes a motor operated under the control of signals from the AF driving control means 103 or the later-described MF driving control means 109, and 106 denotes a focus lens which moves along the optical axis by being driven by the motor 105.

Reference numeral 107 denotes a remote control input terminal for inputting MF command signals and multiplex signals from the relay unit 700 to the lens unit 100, 108 denotes switching signal determining means for determining whether multiplex signals from later-described AF/MF switching signal input means 701 are AF control or MF control, and in the event of MF control whether speed control or positional control of the focus lens 106 is to be performed, outputting S/P switching command signals commanding later-described MF driving control means whether to control the focus lens 106 with speed control or positional control and also switching the AF/MF switching means 104 according to whether the focus lens 106 is to be controlled with speed control or positional control. Reference numeral 109 denotes MF driving control means for generating motor control signals for driving the motor 105 with MF control signals to control the focus lens 106 with one or the other of speed control or positional control, based on S/P switching command signals from the switching signal determining means 108.

In the camera 200, reference numeral 201 denotes a CCD, 202 denotes process means for converting the output signals of the CCD into a picture format such as NTSC signals or the like, and 203 denotes recording/reproducing means for recording the picture signals, which are the output of the process means 202, on a recording medium, and reproducing the pictures recorded therein. Reference numeral 204 denotes output switching means for selecting one of the process means 202 and recording/reproducing means 203 for output of the picture signals, and 205 denotes a picture output terminal for outputting picture signals which are the output of the output switching means.

In the remote control unit 400, reference numeral 401 denotes MF command signal generating means configured of switches and dials for generating MF command signals, 402 denotes S/P switching signal input means for switching between whether the focus lens 106 is to be controlled with speed control or positional control when under MF control, and 403 denotes a remote control output terminal for outputting the MF command signals and S/P switching signals from the remote control unit 400 to the relay unit 700.

In the relay unit 700, reference numeral 701 denotes AF/MF switching signal input means for switching between whether to control the focus lens 106 with AF control or MF control, 702 denotes AF/MF setting state display means for displaying which setting the AF/MF switching signal input means 701 are set to, i.e., whether to control the focus lens 106 with AF control or MF control, 703 denotes a relay unit input terminal for inputting the MF command signals and S/P switching signals from the remote control unit 400 into the relay unit 700, and 704 denotes a relay unit output terminal for outputting the MF command signals and multiplex signals from the relay unit 700 to the lens unit 100.

Now, the manner in which the above-described configuration acts in the event of the AF/MF switching signal input means 701 being set so that the focus lens 106 is controlled by AF control in a case wherein the MF command signal generating means 401 have not been operated, will be described.

The optical flux through the focus lens 106 is imaged on the imaging face of the CCD 201, subjected to photoelectric conversion by the CCD 201, and a held sample is input to process means 202. At the process means 202, the input signals are converted into a picture format such as NTSC signals or the like, and output to the output switching means 204 and recording/reproducing means 203. In a recording state, the output switching means 204 output the output for the process means 202 to the picture output terminal 205, and the recording/reproducing means 203 record the output of the process means 202 to the recording medium. In a reproducing state, the recording/reproducing means 203 reproduce the picture signals recorded in the recording medium, and upon the picture signals being reproduced in a stable manner, the output switching means 204 output the picture signals of the recording/reproducing means 203 to the picture output terminal 205.

Picture signals are input to the picture input terminal 101 of the lens 100 from the picture output terminal 205 of the camera 200 via the picture coaxial cable 300. The evaluation value generating means 102 generates sharpness evaluation values for the picture signals input to the picture input terminal 101, relating to the frequency component of the picture being obtained by filter processing or the like and generated in increments of vertical synchronization cycles of the picture signals, and output the sharpness evaluation values to the AF driving control means 103.

On the other hand, the AF/MF switching signal input means 701 of the relay unit 700 is set to drive the focus lens 106 with AF control, so AF control is displayed on the AF/MF setting state display means 702, and regardless of the state of the S/P switching signal input means 402 a multiplex signal Vref3, which differs from Vref1 or Vref2 is output from the AF/MF switching signal input means 701 to the lens unit 100 and input to the switching signal determining means 108 via the relay unit output terminal 704, relay unit cable 800, and remote control input terminal 107. The switching signal determining means 108 determine the multiplex signals Vref3, and accordingly switch the AF/MF switching means 104 to the A side so as to control the focus lens 106 with AF control. Accordingly, the motor 105 is driven by motor control signals from the AF driving control means 103, and thus the focus lens 106 is moved.

Next, description will be made regarding actions in a case wherein, in the above state, the MF command signal generating means 401 are operated. In the event that the MF command signal generating means 401 are operated while the focus lens 106 is being controlled by AF control, the switching signal determining means 108 determine that the MF command signals from the MF command signal generating means 401 have changed, and switch the AF/MF switching means 104 to the B side. At the same time, at the switching signal determining means 108, in the event the multiplex signal input from the S/P switching signal input means 402 prior to the AF/MF switching signal input means 701 being switched to the AF control via the remote control output terminal 403, remote control cable 500, relay unit input terminal 703, AF/MF switching signal input means 701, relay unit output terminal 704, relay unit cable 800, and remote control input terminal 107, is Vref1 which is different to Vref2 and Vref3, control of the focus lens 106 is performed with speed control, and in the event that the multiplex signal is Vref2 which is different to Vref1 and Vref3, S/P switching command signals are output to the MF driving control means 109 based on information stored beforehand regarding signals which indicate that control of the focus lens 106 is to be performed with positional control. In the event that the S/P switching command signals indicate that the focus lens 106 is to be controlled by speed control, the MF driving control means 109 handle the MF command signals as speed control command signals, generate motor control signals for driving the motor 105 at a speed specified with the MF command signals, and drive the motor 105 to move the focus lens 106. On the other hand, in the event that the S/P switching command signals indicate that the focus lens 106 is to be controlled by positional control, the MF driving control means 109 handle the MF command signals as positional control command signals, generate motor control signals for driving the motor 105 to the position specified with the MF command signals, and drive the motor 105 to move the focus lens 106.

Finally, description will be made regarding the actions in a case wherein the focus lens 106 has been set to being driven by MF control by the AF/MF switching signal input means 701. Operating the MF command signal generating means 401 configured of switches and dials and the like causes MF command signals proportionate to the operations thereof to be output from the MF command signal generating means 401, and input to the switching signal determining means 108 and the MF driving control means 109 via the remote control output terminal 403, remote control cable 500, relay unit input terminal 703, relay unit output terminal 704, relay unit cable 800, and remote control input terminal 107.

On the other hand, at the S/P switching signal input means 402, S/P switching signals for switching between whether to control the focus lens 106 with speed control or with positional control are input to the AF/MF switching signal input means 701 via the remote control output terminal 403, remote control cable 500, and relay unit input terminal 703. The AF/MF switching signal input means 701 are set to control the focus lens 106 with MF control, so the S/P switching signals Vref1 and Vref2 from the S/P switching signal input means 402 are output as a multiplexed signal, and input to the switching signal determining means 108 via the relay unit output terminal 704, relay unit cable 800, and remote control input terminal 107. Also, since the AF/MF switching signal input means 701 are set to control the focus lens 106 with MF control, the AF/MF setting state display means 702 displays MF control. At the switching signal determining means 108, in the event that the input multiplexed signals are Vref1 which is different to Vref2 and Vref3, the AF/MF switching means 104 are switched to the B side so as to control the focus lens 106 with MF control, determination is made to control the focus lens 106 with speed control, and an S/P switching command signal for controlling the focus lens 106 with speed control is output to the MF driving control means 109. Also at the switching signal determining means 108, in the event that the input multiplexed signals are Vref2 which is different to Vref1 and Vref3, the AF/MF switching means 104 are switched to the B side so as to control the focus lens 106 with MF control, determination is made to control the focus lens 106 with positional control, and an S/P switching command signal for controlling the focus lens 106 with positional control is output to the MF driving control means 109. In the event that the S/P switching command signals indicate that the focus lens 106 is to be controlled by speed control, the MF driving control means 109 handle the MF command signals as speed control command signals, generate motor control signals for driving the motor 105 at a speed specified with the MF command signals, and drive the motor 105 to move the focus lens 106. On the other hand, in the event that the S/P switching command signals indicate that the focus lens 106 is to be controlled by positional control, the MF driving control means 109 handle the MF command signals as positional control command signals, generate motor control signals for driving the motor 105 to the position specified with the MF command signals, and drive the motor 105 to move the focus lens 106.

Modifications of First Embodiment

With the present embodiment, although a description has been made regarding an arrangement wherein, in the event that the MF command signal generating means 401 are operated while performing AF control of the focus lens 106, MF control of the focus lens 106 is performed, an arrangement may also be made wherein, in the event that the MF command signal generating means 401 are operated while performing AF control of the focus lens 106, AF control of the focus lens 106 is performed.

Also, with the present embodiment, although a description has been made regarding an arrangement wherein, in the event that the MF command signal generating means 401 are operated while controlling the focus lens 106 with AF control, whether to control the focus lens 106 control to speed control or position control is set according to the state of the S/P switching signal prior to the AF/MF switching signal input means 701 being switched to AF control, an arrangement may be made wherein in the event that the MF command signal generating means 401 are operated while controlling the focus lens 106 with AF control, whether to control the focus lens 106 control to speed control or position control is set to a fixed option, i.e., only one of speed control or position control.

Further, with the present embodiment, although a description has been made regarding an arrangement wherein the AF/MF setting state display means 702 display whether the AF/MF switching signal input means 701 are set to AF control or MF control, an arrangement may be made wherein the AF/MF setting state display means 702 display whether the focus lens 106 is being controlled with AF control or MF control.

Moreover, with the present embodiment, although a description has been made regarding application to an exchangeable lens which is detachable from the camera unit, the embodiment may be similarly applied to an integrally-formed camera unit having a non-detachable lens unit.

Moreover, with the present embodiment, although a description has been made with regard to an arraignment wherein the relay unit cable 800 is connected to the remote control input terminal 107 of the lens unit 100, the present invention is not restricted to this configuration, and the relay unit cable 800 may be connected to the remote control input terminal of the camera unit 200. Note that this arrangement wherein relay unit cable 800 is connected to the remote control input terminal of the camera unit 200 can also be applied to the following second through ninth embodiments, as well.

According to such a configuration, the remote system with AF control is arranged so as to allow switching means for switching between whether to control the focus lens with AF control or with MF control to be provided to the side of the remote control unit which enables remote operations of the lens unit simply by replacing the lens unit with an article capable of handing AF control, thereby enabling including of switching means for switching between whether to control the focus lens with AF control or with MF control to be provided to the side of the remote control unit even though there are no available pins in the electric interface between the remote control unit and the optical device, further enabling MF control when under AF control, thereby making the remote system more useful.

Second Embodiment

Of the first embodiment, the configuration wherein S/P switching signals can be input to the lens unit even in the event that the control of the focus lens is AF control due to the momentary action of the AF/MF switching signal input means, whereby MF control is given priority while the MF command signal generating means are operating under AF control of the focus lens and AF control is performed following operation of the MF command signal generating means, with speed control or position control to be performed for the focus lens being switchable at that time, will be described as the second embodiment of the optical device.

Figure 2:
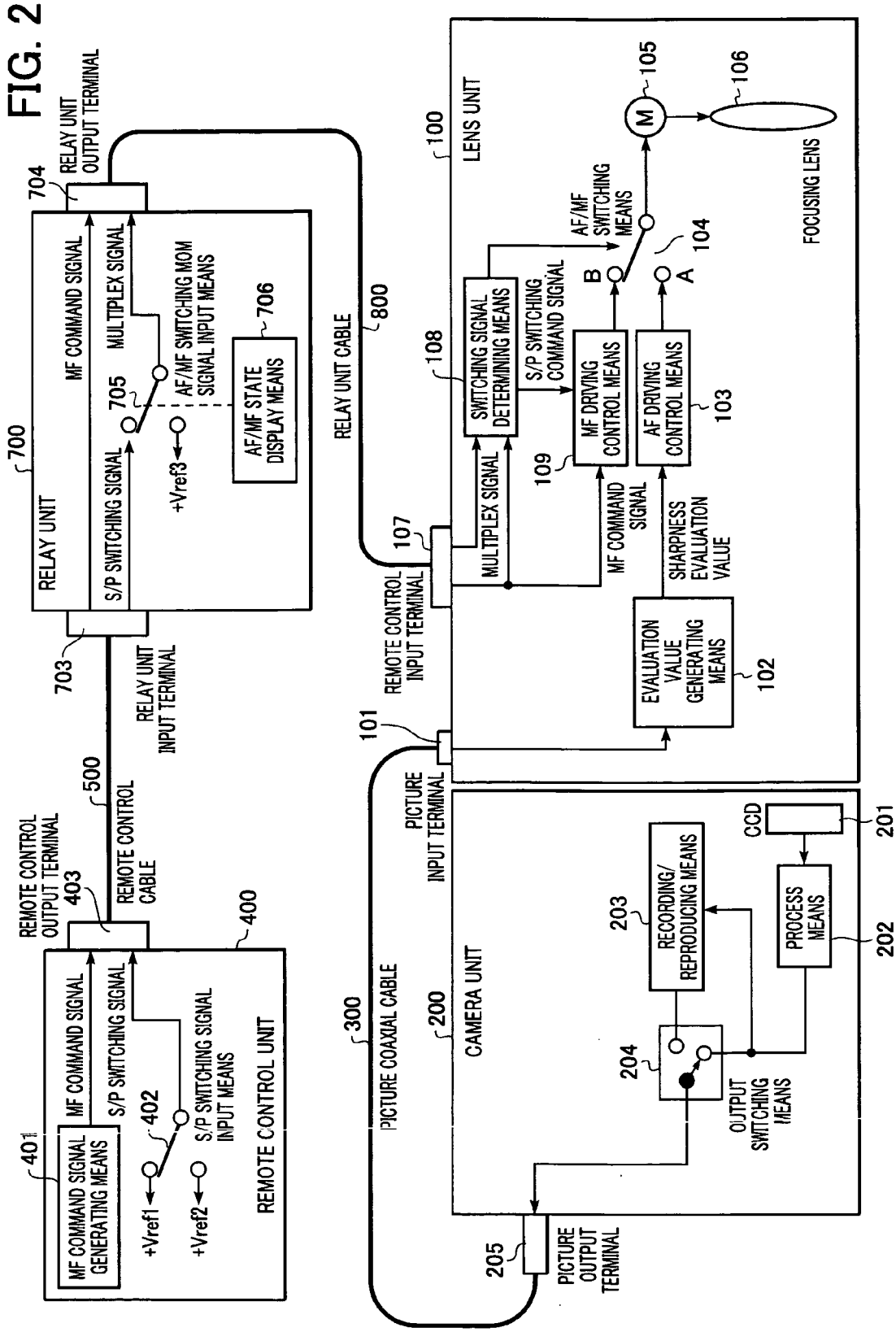
FIG. 2 is a block diagram of a second embodiment of the present invention.

The second embodiment of the present invention will now be described. FIG. 2 illustrates the configuration of an optical device to which the second embodiment of the present invention has been applied. The components denoted by the reference numerals 100 through 109, 200 through 205, 300, 400 through 403, 500, 700, 703, 704, and 800 have already been described above, so description thereof will be omitted.

Reference numeral 705 denotes AF/MF switching MOM signal input means which switch between whether to perform control of the focus lens 106 with AF control or MF control by momentary action, and 706 denotes AF/MF state display means for displaying whether the control of the focus lens 106 is being performed with AF control or with MF control.

Figure 3:
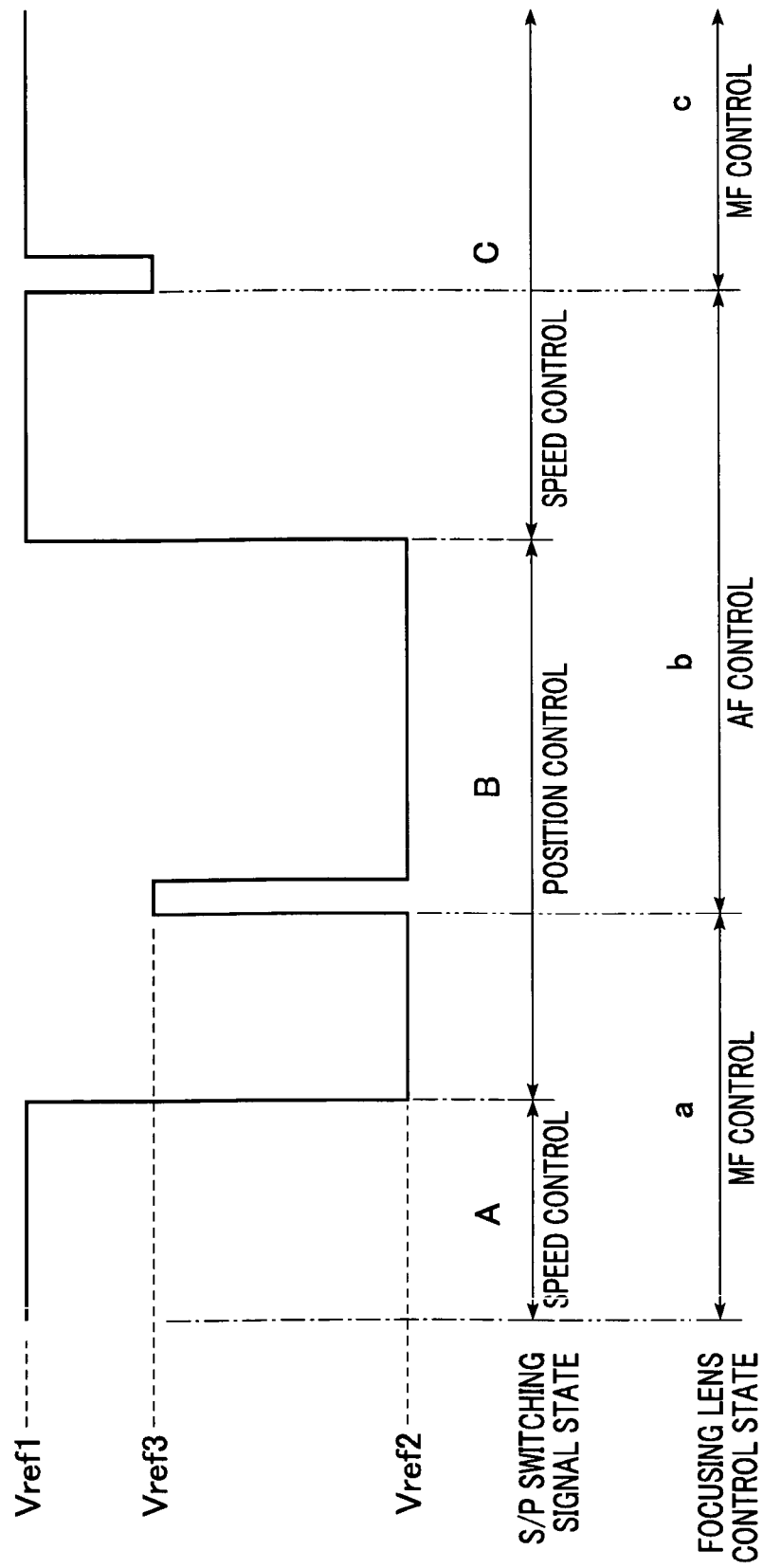
FIG. 3 is a multiplex signal diagram of signals from a relay unit.

The S/P switching signal state and focus lens control state output from the S/P switching signal input means 402 indicated by the multiplex signal output from the relay unit 700 in the above-described configuration will be described with reference to FIG. 3. In this drawing, the solid line represents the multiplex signal output from the relay unit 700, the dotted line represents the voltage level of the switching signal, the one-dash broken lines represent the S/P switching signal state within the multiplex signal, and the two-dash broken lines represent the focus lens control state within the multiplex signal.

Vref1 which is different to Vref2 and Vref3, and Vref2 which is different to Vref1 and Vref3, are output as the output signals of the S/P switching signal input means 402. Here, Vref1 is a signal indicating that the control of the focus lens 106 is to be performed with speed control, and Vref2 is a signal indicating that the control of the focus lens 106 is to be performed with positional control. Also, each time the AF/MF switching MOM signal input means 705 go to Vref3 with momentary action, the AF/MF switching means 104 switch according to determination and instruction of the switching signal determining means 108, thereby alternating between AF control and MF control.

First, the S/P switching signal state sectioned off by the one-dash broken lines will be described. In the regions A and C, speed control is selected for the control of the focus lens 106 since the multiplex signal is Vref1, and in the region B, positional control is selected for the control of the focus lens 106 since the multiplex signal is Vref2.

Next, the focus lens control state sectioned off by the two-dash broken line will be described. The regions a and c are where the focus lens 106 is being controlled under MF control, and the region b is where the focus lens 106 is being controlled under AF control.

In the state that the focus lens 106 is being controlled under MF control, MF control is executed by MF command signals from the MF command signal generating means 401 in the S/P switching signal state. However, even in the state that the focus lens 106 is being controlled under AF control, in the event that the MF command signal generating means 401 are operated, MF control is executed by MF command signals from the MF command signal generating means 401 in the S/P switching signal state.

Now, the actions of the focus lens 106 being driven under AF control by operating the AF/MF switching MOM signal input means 705 in a case wherein the MF command signal generating means 401 is not operated will be described.

The optical flux through the focus lens 106 is imaged on the imaging face of the CCD 201, subjected to photoelectric conversion by the CCD 201, and a held sample is input to process means 202. At the process means 202, the input signals are converted into a picture format such as NTSC signals or the like, and output to the output switching means 204 and recording/reproducing means 203. In the recording state, the output switching means 204 output the output for the process means 202 to the picture output terminal 205, and the recording/reproducing means 203 record the output of the process means 202 to the recording medium. In the reproducing state, the recording/reproducing means 203 reproduce the picture signals recorded in the recording medium, and upon the picture signals being reproduced in a stable manner, the output switching means 204 output the picture signals of the recording/reproducing means 203 to the picture output terminal 205.

Picture signals are input to the picture input terminal 101 of the lens 100 from the picture output terminal 205 of the camera 200 via the picture coaxial cable 300. The evaluation value generating means 102 generates sharpness evaluation values for the picture signals input to the picture input terminal 101, relating to the frequency component of the picture being obtained by filter processing or the like and generated in increments of vertical synchronization cycles of the picture signals, and output the sharpness evaluation values to the AF driving control means 103. The AF/MF switching means 104 are set to the A side, so the motor control signals output from the AF driving control means 103 drive the motor 105 via the AF/MF switching means 104, thereby moving the focus lens 106. In this case, control of the focus lens 106 is set to be performed under AF control, so the AF/MF state display means 706 make a display indicating AF control.

Next, description will be made regarding actions in a case wherein, in the above state, the MF command signal generating means 401 are operated. In the event that the MF command signal generating means 401 are operated while the focus lens 106 is being controlled by AF control, the switching signal determining means 108 determine that the MF command signals from the MF command signal generating means 401 have changed, and switch the AF/MF switching means 104 to the B side. At the same time, at the switching signal determining means 108, in the event the multiplex signal input from the S/P switching signal input means 402 via the remote control output terminal 403, remote control cable 500, relay unit input terminal 703, AF/MF switching MOM signal input means 705, relay unit output terminal 704, relay unit cable 800, and remote control input terminal 107, is Vref1 which is different to Vref2 and Vref3, control of the focus lens 106 is performed with speed control, and in the event that the multiplex signal is Vref2 which is different to Vref1 and Vref3, S/P switching command signals are output to the MF driving control means 109 whereby control of the focus lens 106 is performed with positional control. In the event that the S/P switching command signals indicate that the focus lens 106 is to be controlled by speed control, the MF driving control means 109 handle the MF command signals as speed control command signals, generate motor control signals for driving the motor 105 at a speed specified with the MF command signals, and drive the motor 105 to move the focus lens 106. On the other hand, in the event that the S/P switching command signals indicate that the focus lens 106 is to be controlled by positional control, the MF driving control means 109 handle the MF command signals as positional control command signals, generate motor control signals for driving the motor 105 to the position specified with the MF command signals, and drive the motor 105 to move the focus lens 106. In this case, control of the focus lens 106 is set to MF control, so the AF/MF state display means 706 means make a display indicating MF control.

Finally, description will be made regarding the actions in a case wherein the focus lens 106 has been set to being driven by MF control by the AF/MF switching MOM signal input means 705. Operating the MF command signal generating means 401 configured of switches and dials and the like causes MF command signals proportionate to the operations thereof to be output from the MF command signals generating means 401, and input to the switching signal determining means 108 and the MF driving control means 109 via the remote control output terminal 403, remote control cable 500, relay unit input terminal 703, relay unit output terminal 704, relay unit cable 800, and remote control input terminal 107.

On the other hand, at the S/P switching signal input means 402, S/P switching signals for switching between whether to control the focus lens 106 with speed control or with positional control are input to the AF/MF switching MOM signal input means 705 via the remote control output terminal 403, remote control cable 500, and relay unit input terminal 703. At the AF/MF switching MOM signal input means 705, the input S/P switching signals Vref1 and Vref2 are output as a multiplexed signal, and input to the switching signal determining means 108 via the relay unit output terminal 704, relay unit cable 800, and remote control input terminal 107. At the switching signal determining means 108, in the event that the input multiplexed signals are Vref1 which is different to Vref2 and Vref3, the AF/MF switching means 104 are switched to the B side so as to control the focus lens 106 with MF control, determination is made to control the focus lens 106 with speed control, and an S/P switching command signal for controlling the focus lens 106 with speed control is output to the MF driving control means 109. Also at the switching signal determining means 108, in the event that the input multiplexed signals are Vref2 which is different to Vref1 and Vref3, the AF/MF switching means 104 are switched to the B side so as to control the focus lens 106 with MF control, determination is made to control the focus lens 106 with positional control, and an S/P switching command signal for controlling the focus lens 106 with positional control is output to the MF driving control means 109. In the event that the S/P switching command signals indicate that the focus lens 106 is to be controlled by speed control, the MF driving control means 109 handle the MF command signals as speed control command signals, generate motor control signals for driving the motor 105 at a speed specified with the MF command signals, and drive the motor 105 to move the focus lens 106. On the other hand, in the event that the S/P switching command signals indicate that the focus lens 106 is to be controlled by positional control, the MF driving control means 109 handle the MF command signals as positional control command signals, generate motor control signals for driving the motor 105 to the position specified with the MF command signals, and drive the motor 105 to move the focus lens 106. In this case, control of the focus lens 106 is set to MF control by the AF/MF switching MOM signal input means 705, so the AF/MF state display means 706 means make a display indicating MF control.

With the present embodiment, although a description has been made regarding an arrangement wherein, in the event that the MF command signal generating means 401 are operated while performing AF control of the focus lens 106, MF control of the focus lens is performed, an arrangement may also be made wherein, in the event that the MF command signal generating means 401 are operated while performing AF control of the focus lens 106, AF control of the focus lens is performed.

Also, with the present embodiment, although a description has been made regarding an arrangement wherein, in the event that the MF command signal generating means 401 are operated while controlling the focus lens 106 with AF control, whether to control the focus lens 106 control to speed control or position control is set according to the state of the S/P switching signal output from the S/P switching signal input means 402, an arrangement may be made wherein in the event that the MF command signal generating means 401 are operated while controlling the focus lens 106 with AF control, whether to control the focus lens 106 control to speed control or position control is set to a fixed option, i.e., only one of speed control or position control.

Further, with the present embodiment, although a description has been made regarding an arrangement wherein the AF/MF setting state display means 702 display whether the focus lens 106 is being controlled with AF control or MF control, an arrangement may be made wherein the AF/MF setting state display means 702 display whether the AF/MF switching MOM signal input means 705 have set the control of the focus lens 106 to AF control or to MF control.

Moreover, with the present embodiment, although a description has been made regarding application to an exchangeable lens which is detachable from the camera unit, the embodiment may be similarly applied to an integrally-formed camera unit having a non-detachable lens unit.

According to such a configuration, the advantages of the above-described first embodiment can be had, i.e., the remote system with AF control is arranged so as to allow switching means for switching between whether to control the focus lens with AF control or with MF control to be provided to the side of the remote control unit which enables remote operations of the lens unit simply by replacing the lens unit with an article capable of handing AF control, thereby enabling including of switching means for switching between whether to control the focus lens with AF control or with MF control to be provided to the side of the remote control unit even though there are no available pins in the electric interface between the remote control unit and the optical device, further enabling MF control when under AF control, thereby making the remote system more useful.

Third Embodiment

With the first embodiment, in the event that the MF command signal generating means are operated while control of the focus lens is being performed under AF control, MF control is performed based on S/P command signals recorded beforehand prior to the AF/MF switching signal input means being switched to AF control. A configuration comprising S/P switching setting means for switching between whether to control the focus lens with speed control or positional control in the event that the MF command signal generating means are operated while the focus lens of the lens unit is being controlled with AF control will be described as the third embodiment of the optical device.

Figure 4:
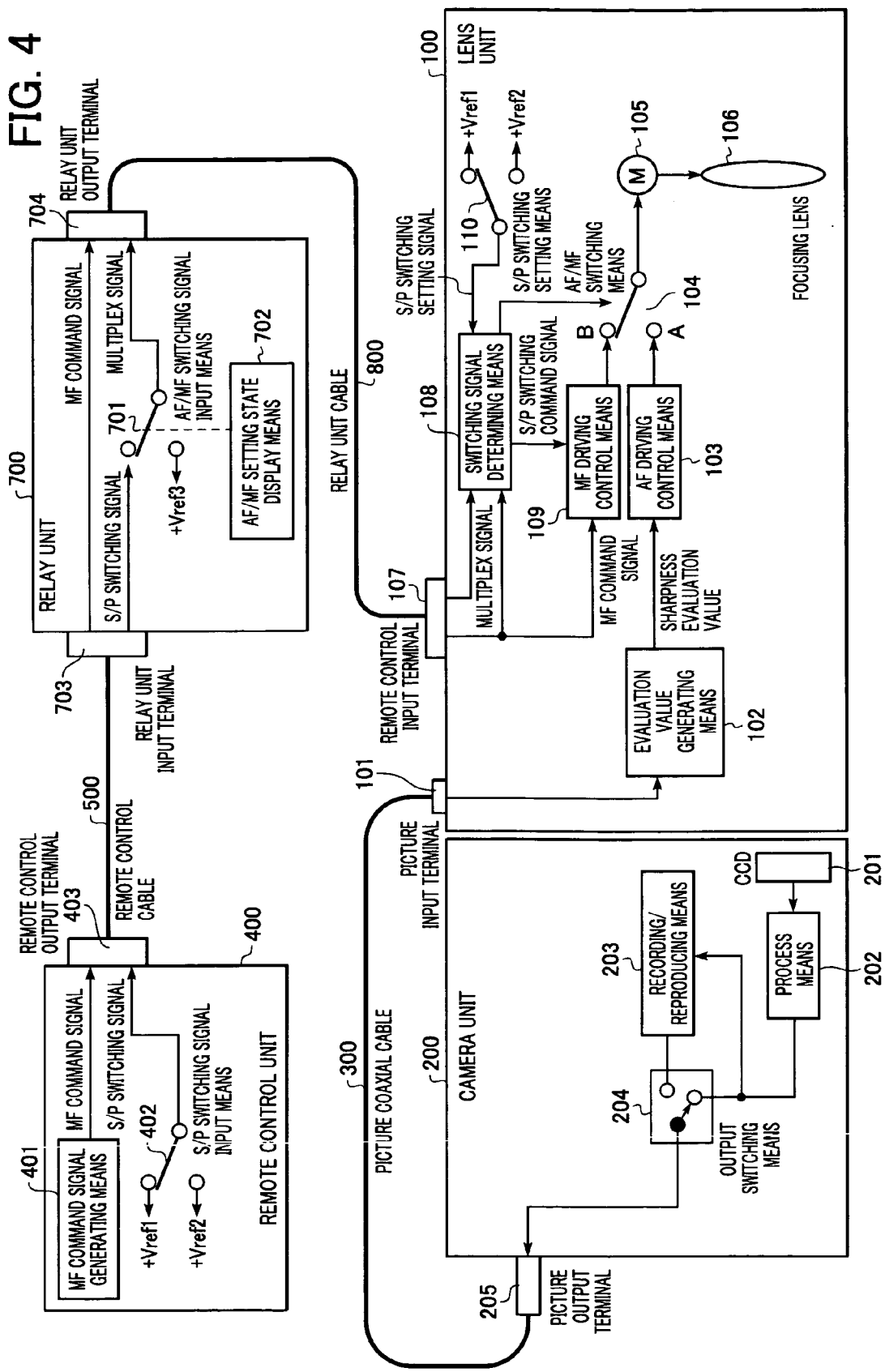
FIG. 4 is a block diagram of a third embodiment of the present invention.

The third embodiment of the present invention will now be described. FIG. 4 illustrates the configuration of an optical device to which the third embodiment of the present invention has been applied. The components denoted by the reference numerals 100 through 109, 200 through 205, 300, 400 through 403, 500, 700 through 704, and 800 have already been described above, so description thereof will be omitted.

Reference numeral 110 denotes S/P switching setting means for switching between whether to perform MF control of the focus lens with speed control or positional control in the event that the MF command signal generating means 401 are operated while the focus lens 106 is being controlled with AF control.

In the above-described configuration, the actions in the event that the settings of the AF/MF switching signal input means 701 are to control the focus lens 106 with AF control, and the MF command signal generating means 401 are not operated, and the actions in the event that the settings are for the focus lens 106 to be controlled with MF control by the AF/MF switching signal input means 701, are the same as those in the first embodiment, so description thereof will be omitted. Rather, the actions in a case wherein the settings of the AF/MF switching signal input means 701 are to control the focus lens 106 with AF control, and the MF command signal generating means 401 are operated, will be described.

In the event that the MF command signal generating means 401 are operated while the focus lens 106 is being controlled with AF control, the switching signal determining means 108 determines that the MF command signal from the MF command signal generating means 401 has changed, and the AF/MF switching means 104 are switched to the B side. At the same time, in the event that the S/P switching setting signal input from the S/P switching setting means 110 is Vref1 which is different to Vref2, control of the focus lens 106 is performed with speed control, and in the event that the S/P switching setting signal input from the S/P switching setting means 110 is Vref2 which is different to Vref1, an S/P switching command signals for performing control of the focus lens 106 with positional control is output to the MF driving control means 109. At the MF driving control means 109, in the event that the S/P switching command signals indicate that the focus lens 106 is to be controlled by speed control, the MF driving control means 109 handle the MF command signals as speed control command signals, generate motor control signals for driving the motor 105 at a speed specified with the MF command signals, and drive the motor 105 to move the focus lens 106. On the other hand, in the event that the S/P switching command signals indicate that the focus lens 106 is to be controlled by positional control, the MF driving control means 109 handle the MF command signals as positional control command signals, generate motor control signals for driving the motor 105 to the position specified with the MF command signals, and drive the motor 105 to move the focus lens 106.

With the present embodiment, although a description has been made regarding application to an exchangeable lens, which is detachable from the camera unit, the embodiment may be similarly applied to an integrally formed camera unit having a non-detachable lens unit.

According to such a configuration, the advantages of the above-described embodiments can be had, i.e., the remote system with AF control is arranged so as to allow switching means for switching between whether to control the focus lens with AF control or with MF control to be provided to the side of the remote control unit which enables remote operations of the lens unit simply by replacing the lens unit with an article capable of handing AF control, thereby enabling including of switching means for switching between whether to control the focus lens with AF control or with MF control to be provided to the side of the remote control unit even though there are no available pins in the electric interface between the remote control unit and the optical device, further enabling MF control when under AF control, thereby making the remote system more useful.

Fourth Embodiment

In the event that the MF command signal generating means 401 disposed in the remote control unit 400 has a mechanical effective rotational angle, and is a dial for generating MF positional command signals, the movable range of the MF command signal generating means 401 is limited. In this case, the rotational angle of the dial corresponds to the position of the focus lens 106 on a one-to-one basis. In the event of performing MF control from the MF command signal generating means 401 while the focus lens 106 is being controlled by AF, the position of the focus lens 106 before MF control and the position following MF control will not match. Accordingly, the MF command signal generating means 401 which perform MF control while the focus lens 106 is being controlled with AF control is preferably MF speed command signals generating means. This holds the true for the above-described first through third embodiments and the following fifth through ninth embodiments as well. While the focus lens 106 is controlled with MF control in the event that the MF command signal generating means 401 are operated while the focus lens 106 is being controlled with AF control, a configuration wherein the relay unit 700 is provided with AF-MF speed command signal generating means 707 for generating MF speed command signals which are valid only in the event that the focus lens 106 is being controlled with AF control will be described as the fourth embodiment of the optical device.

Figure 5:
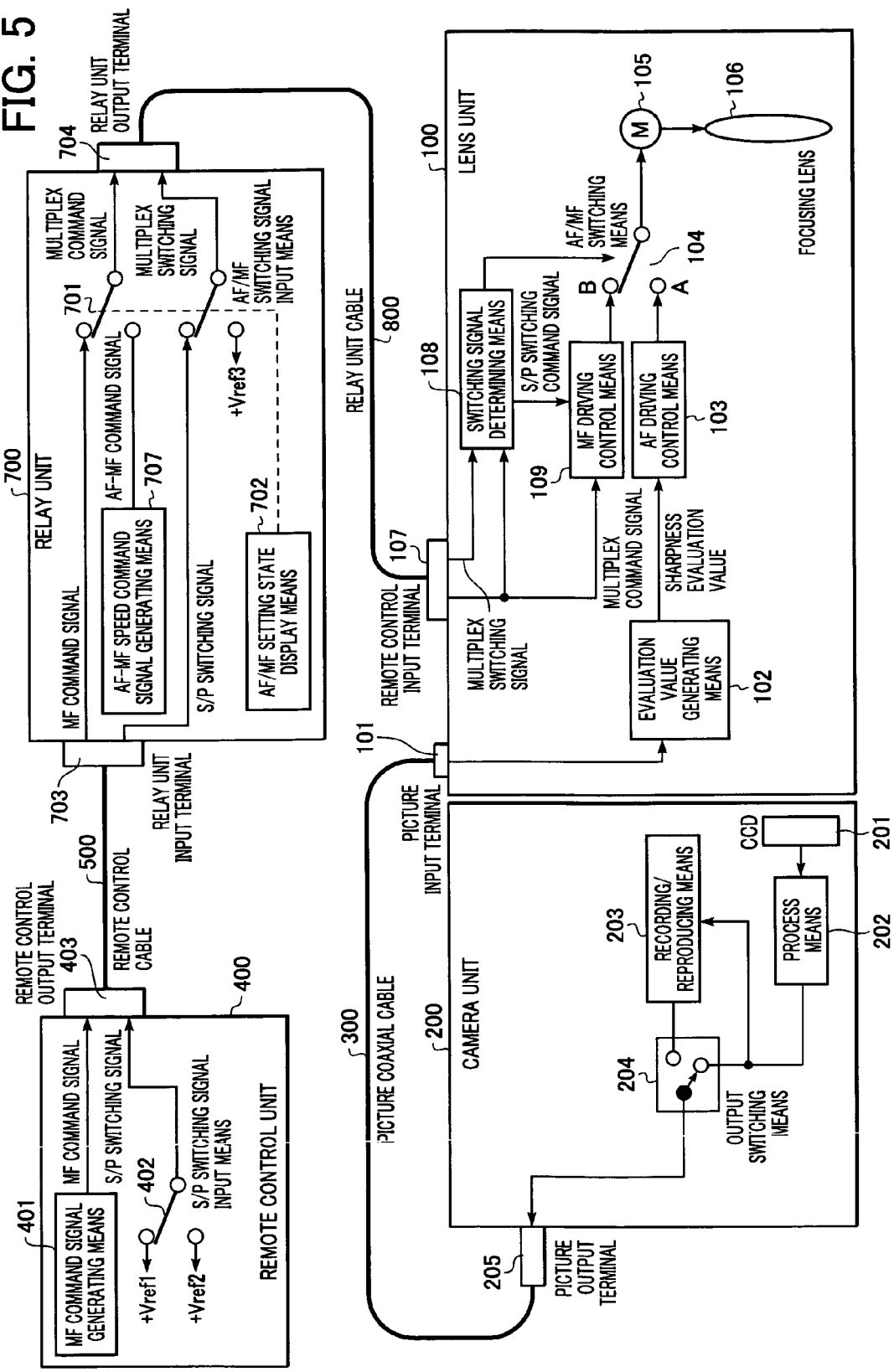
FIG. 5 is a block diagram of a fourth embodiment of the present invention.
Figure 6:
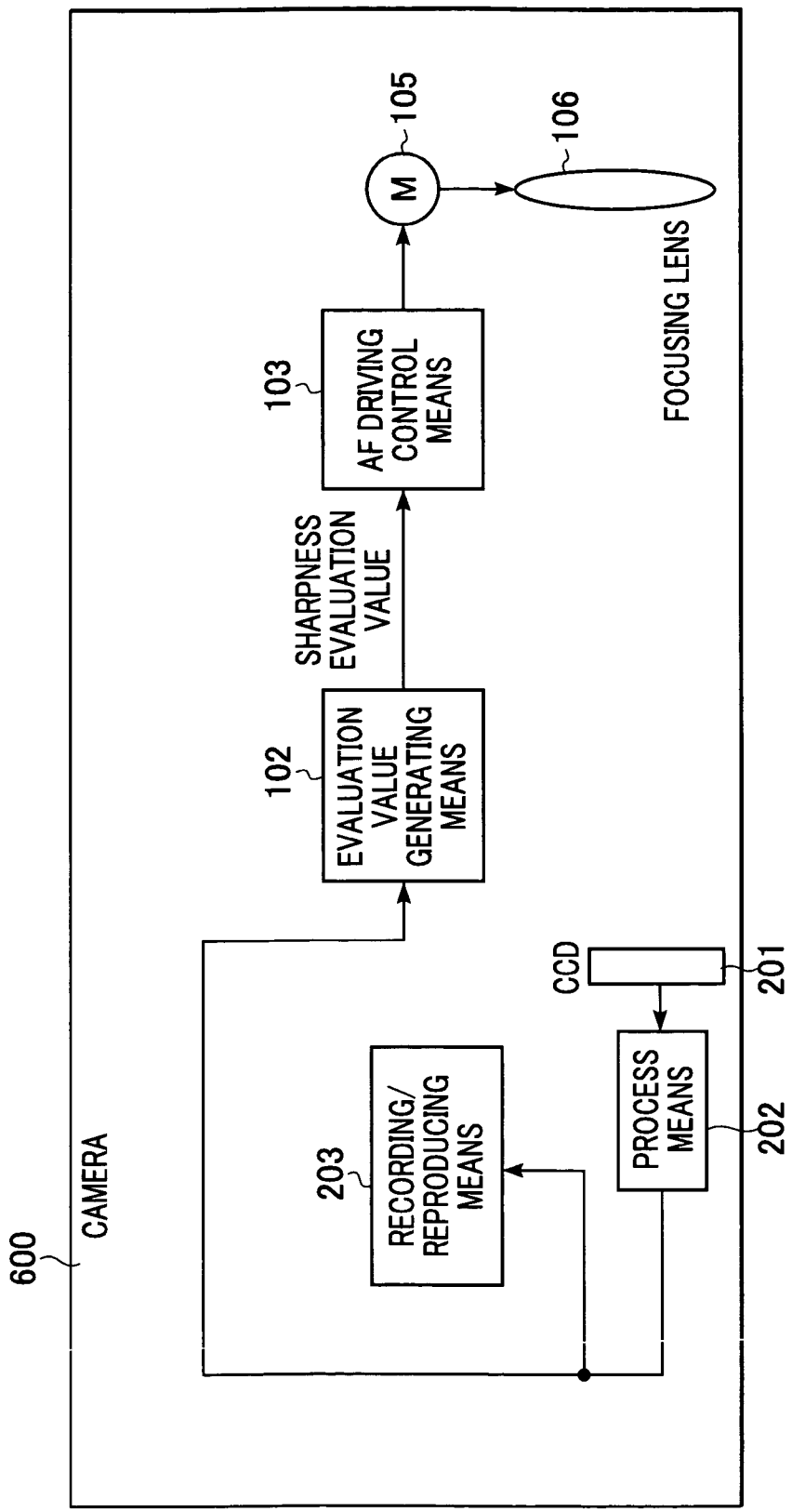
FIG. 6 is a first block diagram of a conventional example.
Figure 7:
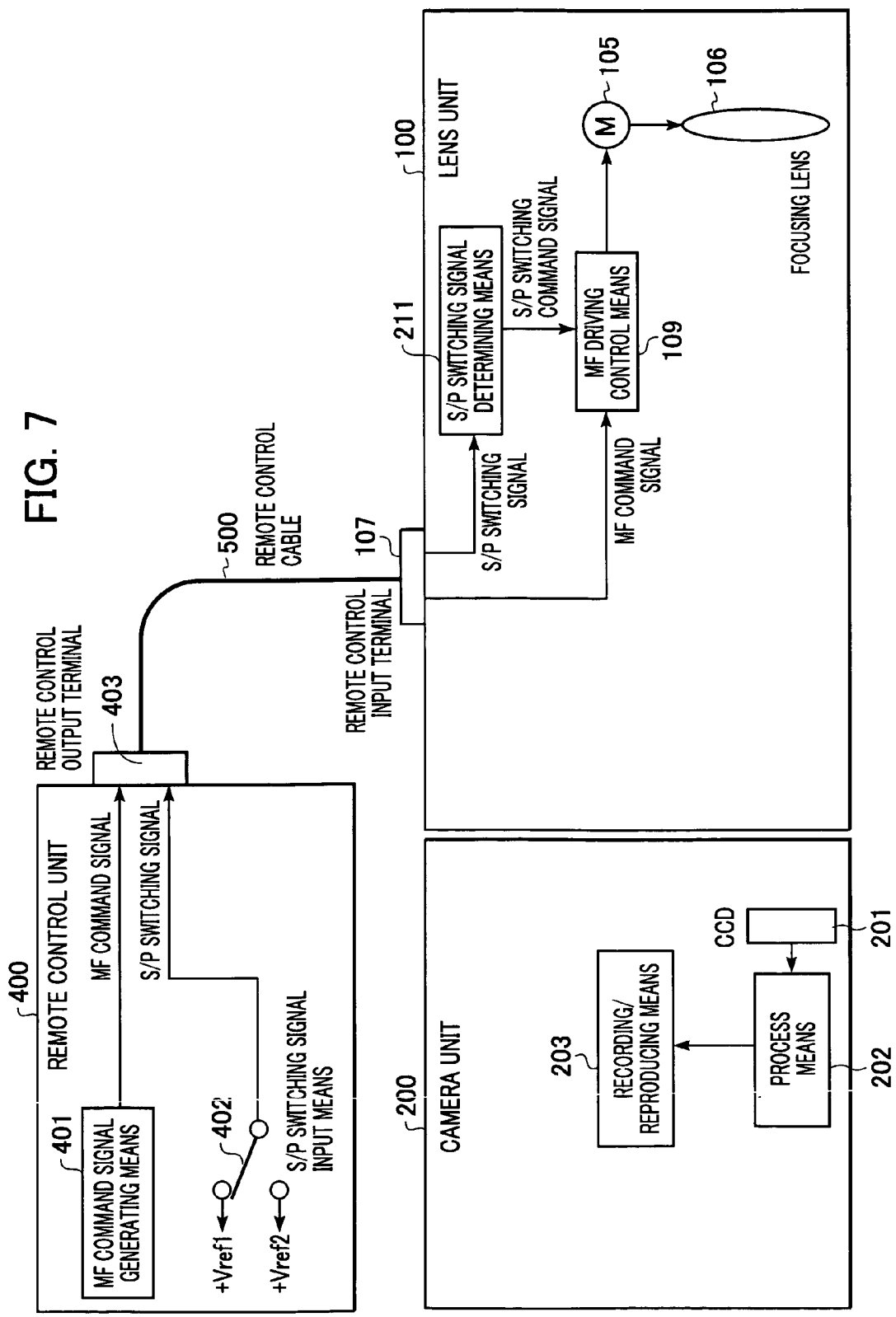
FIG. 7 is a second block diagram of a conventional example.

The fourth embodiment of the present invention will now be described. FIG. 5 illustrates the configuration of an optical device to which the fourth embodiment of the present invention has been applied. The components denoted by the reference numerals 100 through 109, 200 through 205, 300, 400 through 403, 500, 700 through 704, and 800 have already been described above, so description thereof will be omitted.

Reference numeral 707 denotes AF-MF speed command signal generating means disposed within the relay unit 700 for generating AF-MF speed command signals, for controlling the speed of the focus lens 106, which are valid only in the event that the focus lens 106 is being controlled with AF control.

In the above-described configuration, the actions under the settings that the AF/MF switching signal input means 701 are to control the focus lens 106 with AF control, in the event that the AF-MF speed command signal generating means 707 are not operated, will be described.

The optical flux through the focus lens 106 is imaged on the imaging face of the CCD 201, subjected to photoelectric conversion by the CCD 201, and a held sample is input to process means 202. At the process means 202, the input signals are converted into a picture format such as NTSC signals or the like, and output to the output switching means 204 and recording/reproducing means 203. In the recording state, the output switching means 204 output the output for the process means 202 to the picture output terminal 205, and the recording/reproducing means 203 record the output of the process means 202 to the recording medium. In the reproducing state, the recording/reproducing means 203 reproduce the picture signals recorded in the recording medium, and upon the picture signals being reproduced in a stable manner, the output switching means 204 output the picture signals of the recording/reproducing means 203 to the picture output terminal 205.

Picture signals are input to the picture input terminal 101 of the lens 100 from the picture output terminal 205 of the camera 200 via the picture coaxial cable 300. The evaluation value generating means 102 generates sharpness evaluation values for the picture signals input to the picture input terminal 101, relating to the frequency component of the picture being obtained by filter processing or the like and generated in increments of vertical synchronization cycles of the picture signals, and output the sharpness evaluation values to the AF driving control means 103.

On the other hand, the AF/MF switching signal input means 701 of the relay unit 700 are set so as to drive the focus lens 106 with AF control, so AF control is displayed on the AF/MF setting state display means 702, and the multiplex switching signal Vref3 which is different from Vref1 and Vref2 is output to the lens unit 100 from the AF/MF switching signal input means 701 regardless of the state of the S/P switching signal input means 402, and input to the switching signal determining means 108 via the relay unit output terminal 704, relay unit cable 800, and remote control input terminal 107. At the switching signal determining means 108, the input multiplexed signals are Vref3, so the AF/MF switching means 104 are switched to the A side so as to control the focus lens 106 with AF control. Thus, the motor 105 is driven by motor control signals from the AF driving control means 103, thereby moving the focus lens 106.

Next, description will be made regarding actions in a case wherein, in the above state, the AF-MF speed command signal generating means 707 are operated. Operating the AF-MF speed command signal generating means 707 of the relay unit 700, configured of switches and the like, causes AF-MF command signals proportionate to the operations of the AF-MF speed command signal generating means 707 to be output, and input as multiplex command signals from the AF/MF switching signal input means 701 to the switching signal determining means 108 and the MF driving control means 109 via the relay unit output terminal 704, relay unit cable 800, and remote control input terminal 107. In the event that the AF-MF speed command signal generating means 707 are operated while the focus lens 106 is being controlled with AF control, the switching signal determining means 108 determines that the multiplex command signals from the MF command signal generating means 401 have changed, and the AF/MF switching means 104 are switched to the B side. At the same time, at the switching signal determining means 108, the S/P switching command signal for controlling the focus lens 106 with speed control is output to the MF driving control means 109. The S/P switching command signals indicate that the focus lens 106 is to be controlled by speed control, so the MF driving control means 109 handle the multiplex command signals as speed control command signals, generate motor control signals for driving the motor 105 at a speed specified with the MF command signals, and drive the motor 105 to move the focus lens 106.

Finally, description will be made regarding the actions in a case wherein the focus lens 106 has been set to being driven by MF control by the AF/MF switching signal input means 701. Operating the MF command signal generating means 401 configured of switches and dials and the like causes MF command signals proportionate to the operations thereof to be output, and input to the input to the AF/MF switching signal input means 701 via the remote control output terminal 403, remote control cable 500, and relay unit input terminal 703. The AF/MF switching signal input means 701 are set so as to drive the focus lens 106 with MF control, so MF command signals are output as multiplex command signals from the MF command signal generating means 401, and input to the switching signal determining means 108 and MF driving control means 109 via the relay unit output terminal 704, relay unit cable 800, and remote control input terminal 107.

On the other hand, at the S/P switching signal input means 402, S/P switching signals for switching between whether to control the focus lens 106 with speed control or with positional control are input to the AF/MF switching signal input means 701 via the remote control output terminal 403, remote control cable 500, and relay unit input terminal 703. At the AF/MF switching signal input means 701, control of the focus lens 106 is set to MF control, so the input S/P switching signals Vref1 and Vref2 are output from the S/P switching signal input means 402 as a multiplexed signal, and input to the switching signal determining means 108 via the relay unit output terminal 704, relay unit cable 800, and remote control input terminal 107. Also, the AF/MF switching signal input means 701 are set to control the focus lens 106 with MF control, so MF control is displayed at the AF/MF setting state display means 702. At the switching signal determining means 108, in the event that the input multiplexed signals are Vref1 which is different to Vref2 and Vref3, the AF/MF switching means 104 are switched to the B side so as to control the focus lens 106 with MF control, determination is made to control the focus lens 106 with speed control, and an S/P switching command signal for controlling the focus lens 106 with speed control is output to the MF driving control means 109. Also at the switching signal determining means 108, in the event that the input multiplexed signals are Vref2 which is different to Vref1 and Vref3, the AF/MF switching means 104 are switched to the B side so as to control the focus lens 106 with MF control, determination is made to control the focus lens 106 with positional control, and an S/P switching command signal for controlling the focus lens 106 with positional control is output to the MF driving control means 109. In the event that the S/P switching command signals indicate that the focus lens 106 is to be controlled by speed control, the MF driving control means 109 handle the MF command signals as speed control command signals, generate motor control signals for driving the motor 105 at a speed specified with the MF command signals, and drive the motor 105 to move the focus lens 106. On the other hand, in the event that the S/P switching command signals indicate that the focus lens 106 is to be controlled by positional control, the MF driving control means 109 handle the MF command signals as positional control command signals, generate motor control signals for driving the motor 105 to the position specified with the MF command signals, and drive the motor 105 to move the focus lens 106.

With the present embodiment, although a description has been made regarding an arrangement wherein MF speed command signals, which are valid only in the event that the focus lens 106 is being controlled with AF control, control the focus lens 106 with speed control, an arrangement may be made wherein MF speed command signals which are valid only in the event that the focus lens 106 is being controlled with AF control, control the focus lens 106 with positional control.

With the present embodiment, although a description has been made regarding an arrangement wherein MF speed command signals, which are valid only in the event that the focus lens 106 is being controlled with AF control, control the focus lens 106 with speed control, an arrangement may be made wherein setting means having the functions equivalent to the S/P switching setting means described in the third embodiment are disposed within the lens unit 100, so that MF speed command signals which are valid only in the event that the focus lens 106 is being controlled with AF control, control the focus lens 106 with either speed control or positional control.

Also, with the present embodiment, although a description has been made regarding an arrangement wherein the AF/MF setting state display means 702 display whether the AF/MF switching signal input means 701 are set to AF control or MF control, an arrangement may be made wherein the AF/MF setting state display means 702 display whether the focus lens 106 is being controlled with AF control or MF control.

Further, with the present embodiment, although a description has been made regarding application to an exchangeable lens which is detachable from the camera unit, the embodiment may be similarly applied to an integrally-formed camera unit having a non-detachable lens unit.

According to such a configuration, the advantages of the above-described embodiments can be had, i.e., the remote system with AF control is arranged so as to allow switching means for switching between whether to control the focus lens with AF control or with MF control to be provided to the side of the remote control unit which enables remote operations of the lens unit simply by replacing the lens unit with an article capable of handing AF control, thereby enabling including of switching means for switching between whether to control the focus lens with AF control or with MF control to be provided to the side of the remote control unit even though there are no available pins in the electric interface between the remote control unit and the optical device, further enabling MF control when under AF control, thereby making the remote system more useful.

Fifth Embodiment

Figure 8:
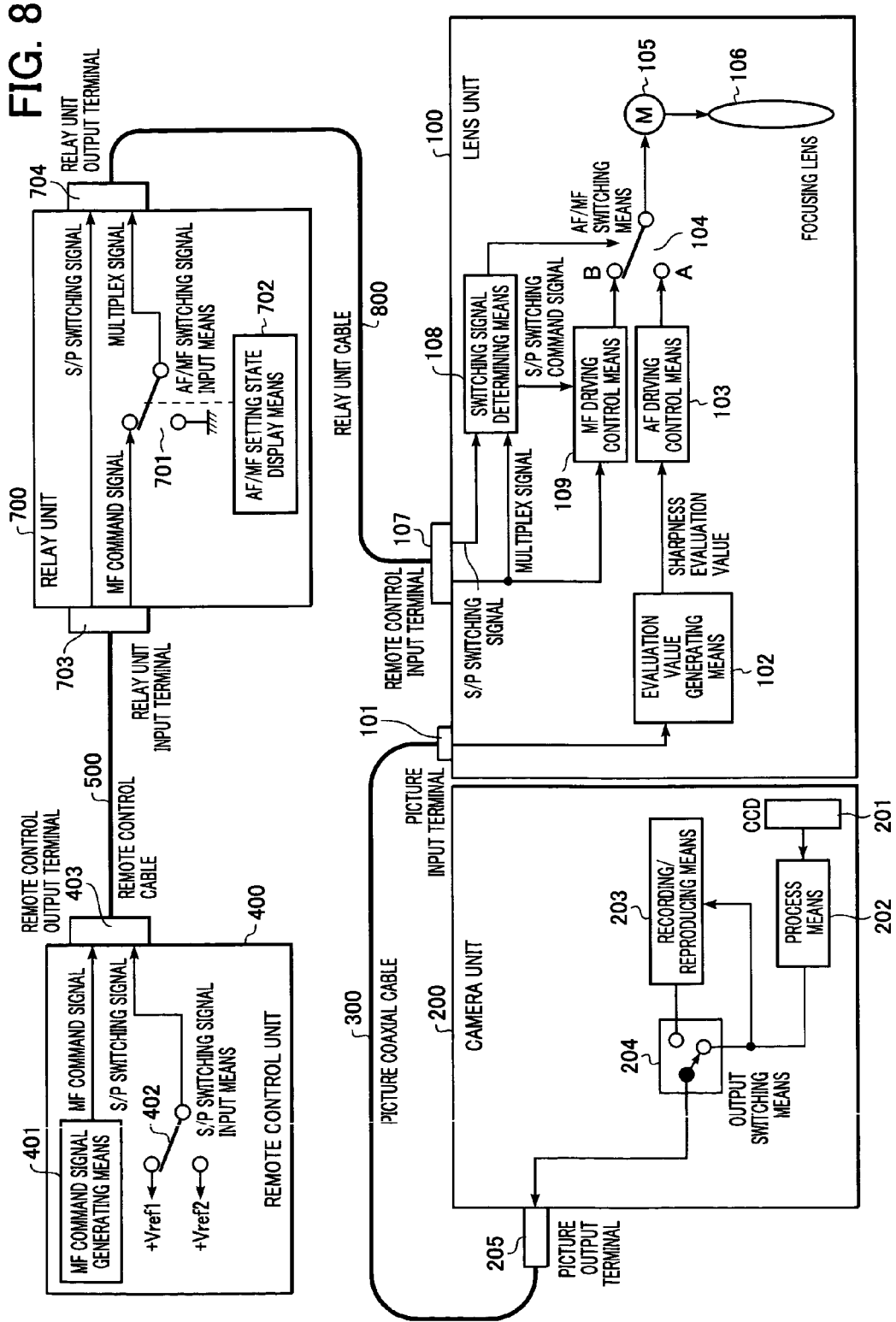
FIG. 8 is a block diagram of a fifth embodiment of the present invention.

A fifth embodiment of the present invention will now be described. FIG. 8 illustrates the configuration of an optical device to which the fifth embodiment of the present invention has been applied.

In FIG. 8, reference numeral 100 denotes an exchangeable lens unit, 200 denotes a camera unit, 300 denotes a picture coaxial cable, 400 denotes a remote control unit for supplying the lens unit 100 with control signals for controlling an unshown zoom lens unit, iris unit, and focus lens 106 within the lens unit 100, and with switching signals for switching between whether to control the unshown zoom lens unit, iris unit, and focus lens 106 with speed control or with positional control, 500 denotes a remote control cable for connecting the remote control unit 400 with a later-described relay unit 700, which in turn is situated between the remote control unit 400 and the lens unit 100 and multiplexes switching signals regarding whether to control the focus lens 106 with AF control or MF control upon MF command signals which are the output from the MF command signal generating means 401, and displays whether the focus lens 106 is being controlled with AF control or MF control, and 800 denotes a relay unit capable for connecting the relay unit 700 and the lens unit 100.

In the lens unit 100, reference numeral 101 denotes a picture input terminal for inputting picture signals via a picture coaxial cable 300, 102 denotes evaluation value generating means for extracting a sharpness evaluation value from the picture signals output from process means 202, and 103 denotes AF driving control means for generating motor control signals such that the sharpness evaluation value generated by the evaluation value generating means 102 is maximized. Reference numeral 104 denotes AF/MF switching means controlled by later-described switching signal determining means 108, for switching between whether to drive the focus lens 106 with motor control signals from the AF driving control means 103 or with motor control signals from the later-described MF driving control means 109, 105 denotes a motor operated with motor control signals from the AF driving control means 103 or the later-described MF driving control means 109, and 106 denotes a focus lens which moves along the optical axis by being driven by the motor 105. Reference numeral 107 denotes a remote control input terminal for inputting S/P switching signals and multiplex signals from the relay unit 700 to the lens unit 100, 108 denotes switching signal determining means for determining whether multiplex signals from later-described AF/MF switching signal input means 701 are AF control or MF control, and in the event of MF control whether speed control or positional control of the focus lens 106 is to be performed, outputting S/P switching command signals commanding whether to control the focus lens 106 with speed control or positional control to the MF driving control means 109 and also switching the AF/MF switching means according to whether the focus lens 106 is to be controlled with AF control or MF control. Reference numeral 109 denotes MF driving control means for generating motor control signals for driving the motor 105 with MF control signals to control the focus lens 106 with one or the other of speed control and positional control, based on S/P switching command signals from the switching signal determining means 108.

In the camera 200, reference numeral 204 denotes output switching means for selecting one of the process means 202 and recording/reproducing means 203 for output of the picture signals, and 205 denotes a picture output terminal for outputting picture signals which are the output of the output switching means 204.

In the remote control unit 400, reference numeral 401 denotes MF command signal generating means configured of switches and dials for generating MF command signals, 402 denotes S/P switching signal input means for switching between whether the focus lens 106 is to be controlled with speed control or positional control, and 403 denotes a remote control output terminal for outputting the MF command signals and S/P switching signals from the remote control unit 400 to the relay unit 700.

In the relay unit 700, reference numeral 701 denotes AF/MF switching signal input means for switching between whether to control the focus lens 106 with AF control or MF control, 702 denotes AF/MF setting state display means for displaying which setting the AF/MF switching signal input means 701 are set to, i.e., whether to control the focus lens 106 with AF control or MF control, 703 denotes a relay unit input terminal for inputting the MF command signals and S/P switching signals from the remote control unit 400 into the relay unit 700, and 704 denotes a relay unit output terminal for outputting the multiplex signals and S/P switching signals from the relay unit 700 to the lens unit 100.

Now, the manner in which the above-described configuration acts in the event of the AF/MF switching signal input means 701 being set so that the control signal for driving the focus lens 106 is driven by the control signal from the AF driving control means 103, will be described.

The optical flux through the focus lens 106 is imaged on the imaging face of the CCD 201, subjected to photoelectric conversion by the CCD 201, and a held sample is input to process means 202. At the process means 202, the input signals are converted into a picture format such as NTSC signals or the like, and output to the evaluation value generating means 102 and recording/reproducing means 203. The evaluation value generating means 102 generates sharpness evaluation values for the picture signals input thereto, relating to the frequency component of the picture being obtained by filter processing or the like and generated in increments of vertical synchronization cycles of the picture signals, and output the sharpness evaluation values to the AF driving control means 103.

On the other hand, the AF/MF switching signal input means 701 of the relay unit 700 are set to drive the focus lens 106 with control signals from the AF driving control means 103, so level signals outside of the output range of the MF command signal generating means 401 are output from the AF/MF switching signal input means 701. For example, in the event of controlling the focus lens 106 with speed control in a MF command signal output range of the MF command signal generating means 401 of +2.5 V to +7.5 V, speed control is performed with +5.0 V serving as a stop signal and the focus lens 106 is subjected to speed control toward the infinity side in the event that the signal is between +5.0 V to +7.5 V and toward the close-up side in the event that the signal is between +5.0 V to +2.5 V. Further, the speed is greater the farther the value is from +5.0 V, so the focus lens 106 is driven at maximum speed in the event that the value is +7.5 V or +2.5 V.

Now, with the above-described arrangement, the signal whereby the AF/MF switching signal input means 701 sets the control signals from the AF driving control means 103 as the control signals for driving the focus lens 106 is 0 V. The AF/MF switching signal input means 701 are set to control the focus lens 106 with AF control, so AF control is displayed on the AF/MF setting state display means 702. The level signals outside of the output range of the MF command signal generating means 401 are input to the switching signal determining means 108 via the relay unit output terminal 704, relay unit cable 800, and remote control input terminal 107, whereby the switching signal determining means 108 determine that the signals are level signals outside of the output range of the MF command signal generating means 401, and accordingly switch the AF/MF switching means 104 to the A side. Accordingly, the motor 105 is driven by motor control signals from the AF driving control means 103, and thus the focus lens 106 is moved.

Next, description will be made regarding actions in a case wherein the S/P switching signal input means 402 are set to drive the focus lens 106 with motor control signals from the MF driving control means 109. Operating the MF command signal generating means 401 configured of switches and dials and the like causes MF command signals proportionate to the operations thereof to be output, and input to the input means 701 via the remote control output terminal 403, remote control cable 500, and relay unit input terminal 703. The AF/MF switching signal input means 701 are set to drive the focus lens 106 with motor control signals from the MF driving control means 109, so the MF command signals from the MF command signal generating means 401 are output as multiplex command signals, and input to the switching signal determining means 108 and MF driving control means 109 via the relay unit output terminal 704, relay unit cable 800, and remote control input terminal 107. The AF/MF switching signal input means 701 are set to control the focus lens 106 with MF control, so MF control is displayed on the AF/MF setting state display means 702. Also, in the event that MF control is being performed to control the focus lens, S/P switching signals for setting whether to control the focus lens with speed control or with positional control are output from the S/P switching signal input means 402, and input to the switching signal determining means 108 via the remote control output terminal 403, remote control cable 500, relay unit input terminal 703, relay unit output terminal 704, relay unit cable 800, and remote control input terminal 107. Here, let us say that the S/P switching signal output is Vref1 in the event of controlling the focus lens 106 with speed control, and Vref2 in the event of controlling the focus lens 106 with positional control. The switching signal determining means 108 determine that the input multiplex signals are level signals within the output range of the MF command signal generating means 401, switch the AF/MF switching means 104 to the B side, and in the event that the input S/P switching signal Vref2 determines that control of the focus lens 106 is to be made with positional control, and outputs a S/P switching command signal of positional control of the focus lens 106 to the MF driving control means 109. In the event that the S/P switching command signals indicate that the focus lens 106 is to be controlled by speed control, the MF driving control means 109 handle the MF command signals as speed control command signals, generate motor control signals for driving the motor 105 at a speed specified with the MF command signals, and drive the motor 105 to move the focus lens 106. On the other hand, in the event that the S/P switching command signals indicate that the focus lens 106 is to be controlled by positional control, the MF driving control means 109 handle the MF command signals as positional control command signals, generate motor control signals for driving the motor 105 to the position specified with the MF command signals, and drive the motor 105 to move the focus lens 106.

With the present embodiment, although a description has been made regarding application to an exchangeable lens, which is detachable from the camera unit, the embodiment may be similarly applied to an integrally formed camera unit having a non-detachable lens unit.

According to such a configuration, the advantages of the above-described embodiments can be had, i.e., the remote system with AF control is arranged so as to allow switching means for switching between whether to control the focus lens with AF control or with MF control to be provided to the side of the remote control unit which enables remote operations of the lens unit simply by replacing the lens unit with an article capable of handing AF control, thereby enabling including of switching means for switching between whether to control the focus lens with AF control or with MF control to be provided to the side of the remote control unit even though there are no available pins in the electric interface between the remote control unit and the optical device, further enabling MF control when under AF control, thereby making the remote system more useful.

Sixth Embodiment

An optical device, having a configuration wherein the AF/MF switching signal input means of the fifth embodiment performs momentary actions, whereby MF command signals are input to the lens unit even in the event of controlling the focus lens with AF control, with MF control being given priority in the event that the MF command signal generating means are operated while controlling the focus lens under AF control, AF control then being performed at the point that the operations of the MF command signal generating means end, will be described as a sixth embodiment.

Figure 10:
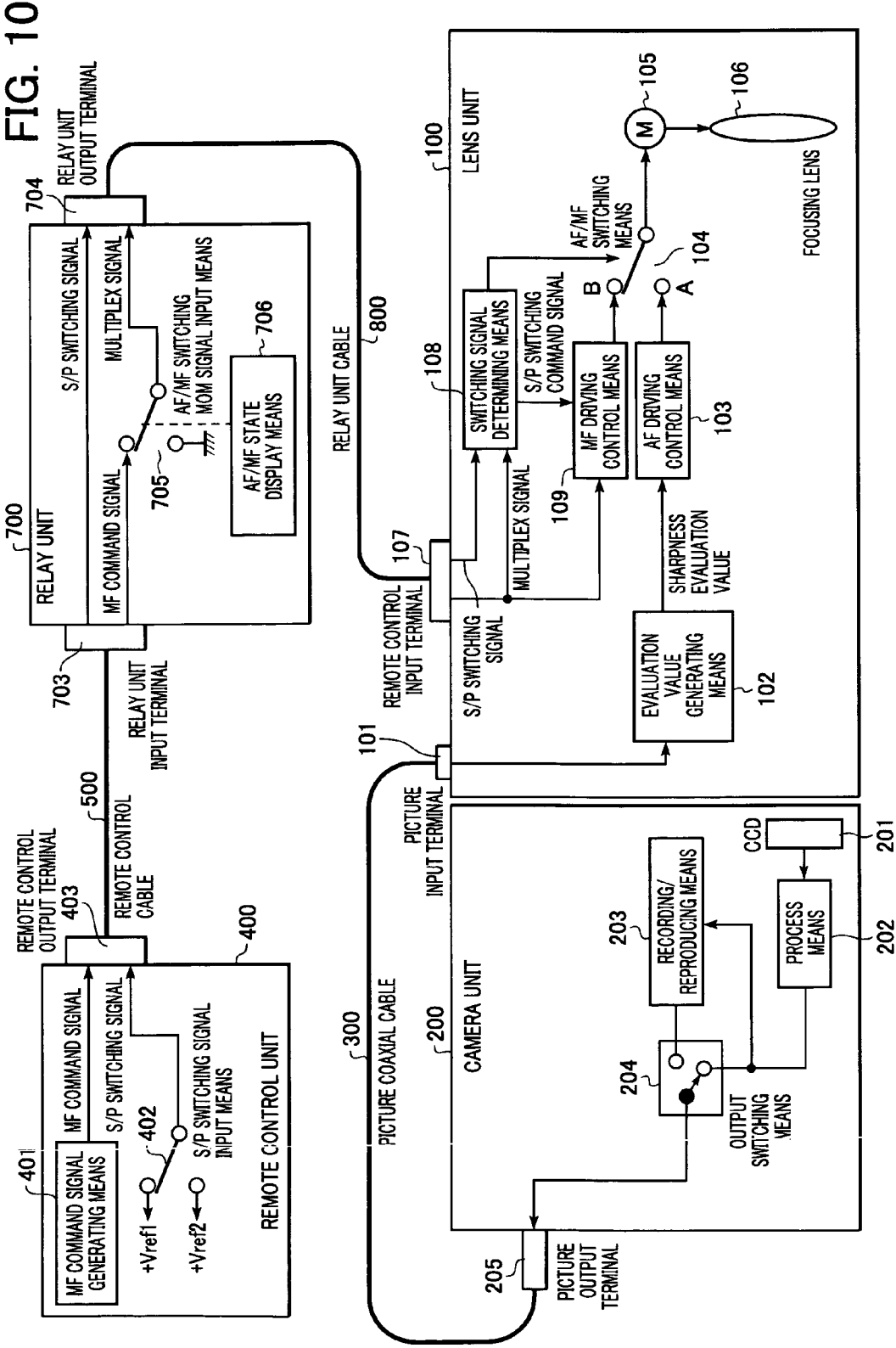
FIG. 10 is a block diagram of a sixth embodiment of the present invention.

The sixth embodiment of the present invention will now be described with reference to the drawings. FIG. 10 illustrates the configuration of an optical device to which the sixth embodiment of the present invention has been applied. The components denoted by the reference numerals 100 through 109, 200 through 205, 300, 400 through 403, 500, 700, 703, 704, and 800 have already been described above, so description thereof will be omitted.

Reference numeral 705 denotes AF/MF switching MOM signal input means which switch between whether to perform control of the focus lens 106 with AF control or MF control by momentary action, and 706 denotes AF/MF state display means for displaying whether the control of the focus lens 106 is being performed with AF control or with MF control.

Figure 9:
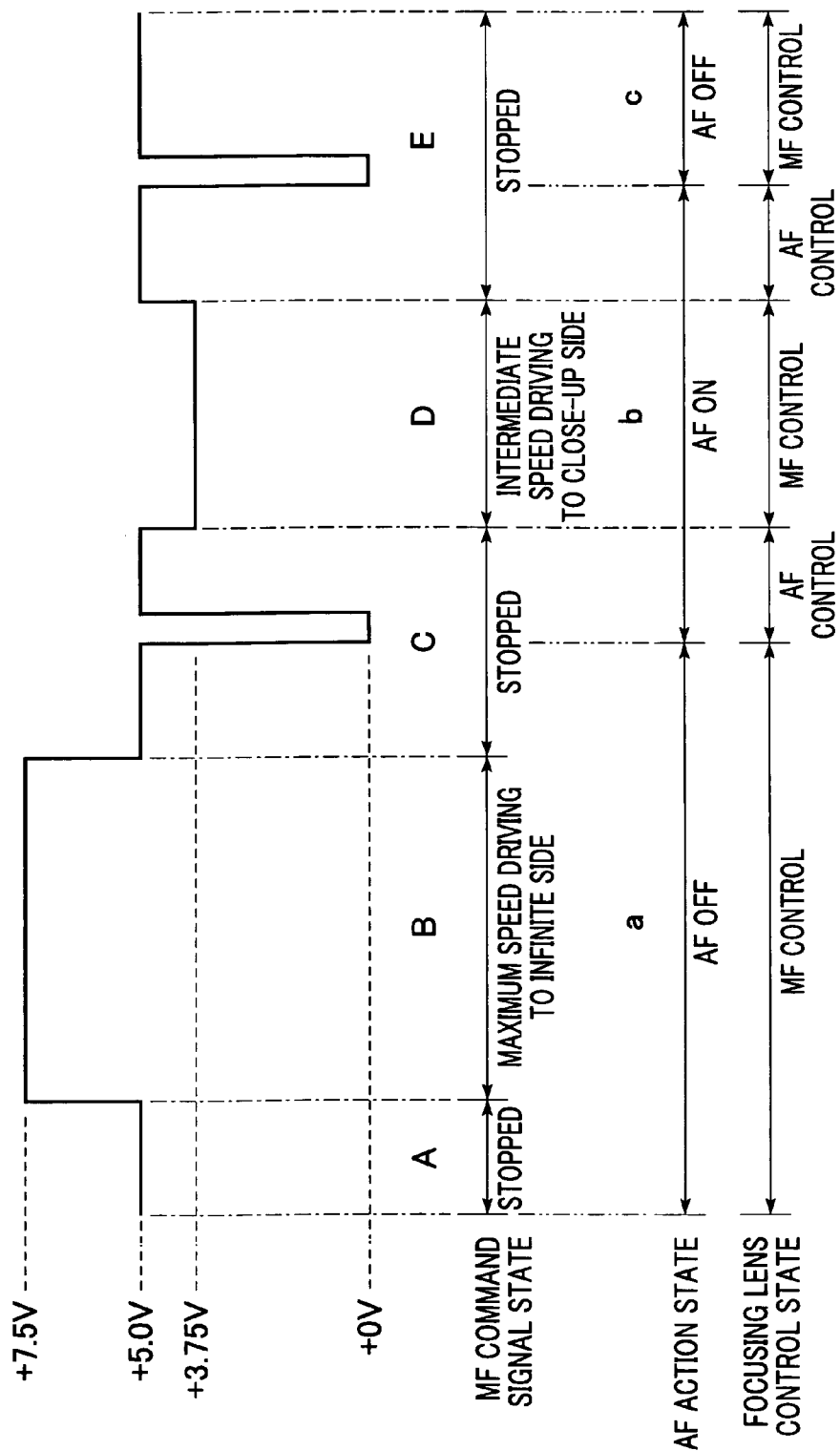
FIG. 9 is a switching signal diagram of signals from the relay unit.

With the above configuration, an example of the MF command signals from the MF command signal generating means 401 being speed control will be described with reference to FIG. 9, for each control state of the focus lens 106, i.e., AF control and MF control. In this drawing, the solid line represents the multiplex signal output from the relay unit 700, the dotted line represents the voltage level of the multiplex signal, the one-dash broken lines represent the state of the MF command signals output from the MF command signal generating means 401 within the remote control unit 400, and the two-dash broken lines represent the AF action state under operations of the AF/MF switching MOM signal input means within the relay unit 700.

In the event of controlling the focus lens 106 with speed control in a MF command signal output range of the MF command signal generating means 401 of +2.5 V to +7.5 V, speed control is performed with +5.0 V serving as a stop signal and the focus lens 106 is subjected to speed control toward the infinity side in the event that the signal is between +5.0 V to +7.5 V and toward the close-up side in the event that the signal is between +5.0 V to +2.5 V. The speed is greater the farther the value is from +5.0 V, so the focus lens 106 is driven at maximum speed in the event that the value is +7.5 V or +2.5 V. Each time the AF/MF switching MOM signal input means 705 go to 0 V in the momentary action, the AF/MF switching means 104 switch under determination made by the switching signal determining means 108, and AF control and MF control is alternately repeated.

First, the MF command signal state sectioned off by the single-dash broken line will be described. The symbols A, C, and E represent a state wherein the focus lens 106 is stopped due to the remote control output signal being +5.0 V, B represents a state wherein the focus lens 106 is driven toward the infinity side at full speed due to the remote control output signal being +7.5 V, and D represents a state wherein the focus lens 106 is driven toward the close-up side at intermediate speed due to the remote control output signal being +3.75 V.

Next, the AF action state sectioned off by the two-dash broken line will be described. The regions a and c are where AF is off, and the region b is where AF is on.

Finally, the control state of the focus lens 106 will be described. In the regions a and c, AF is off so the focus lens 106 is in the MF control state, in the region portion D in the region b the focus lens 106 is in the MF control state because the MF command signal generating means 401 has been operated and MF command signals are being output, and in portions other than the region portion D in the region b the focus lens 106 is in the AF control state.

Now, the actions in the event that the focus lens 106 is set to be driven with AF control by the AF/MF switching MOM signal input means 705 being operated, will be described.

The optical flux through the focus lens 106 is imaged on the imaging face of the CCD 201, subjected to photoelectric conversion by the CCD 201, and a held sample is input to process means 202. At the process means 202, the input signals are converted into a picture format such as NTSC signals or the like, and output to the evaluation value generating means 102 and recording/reproducing means 203. Picture signals are input to the picture input terminal 101 of the lens 100 from the picture output terminal 205 of the camera 200 via the picture coaxial cable 300. The evaluation value generating means 102 generates sharpness evaluation values for the picture signals input to the picture input terminal 101, relating to the frequency component of the picture being obtained by filter processing or the like and generated in increments of vertical synchronization cycles of the picture signals, and output the sharpness evaluation values to the AF driving control means 103. The AF/MF switching means 104 are set to the A side, so the motor control signals output from the AF driving control means 103 drive the motor 105 via the AF/MF switching means 104, thereby moving the focus lens 106. In this case, control of the focus lens 106 is set to be performed under AF control by the AF/MF switching MOM signal input means 705 being operated, so the AF/MF state display means 706 make a display indicating AF control.

Next, a case wherein the focus lens 106 is set to be driven with MF control by the AF/MF switching MOM signal input means 705 will be described. Operating the MF command signal generating means 401 configured of switches and dials and the like causes MF command signals proportionate to the operations thereof to be output, and input to the remote control output terminal 403, remote control cable 500, relay unit input terminal 703, and AF/MF switching MOM signal input means 705. The AF/MF switching MOM signal input means 705 is set such that the control signals for driving the focus lens 106 are the control signals from the MF driving control means 109, so the MF command signals from the MF command signal generating means 401 are output as multiplex command signals, and input to the switching signal determining means 108 and MF driving control means 109 via the relay unit output terminal 704, relay unit cable 800, and remote control input terminal 107. The AF/MF switching MOM signal input means 705 are set to control the focus lens 106 with MF control, so MF control is displayed on the AF/MF switching state display means 706. Also, in the event that MF control is being performed to control the focus lens, S/P switching signals for setting whether to control the focus lens with speed control or with positional control are output from the S/P switching signal input means 402, and input to the switching signal determining means 108 via the remote control output terminal 403, remote control cable 500, relay unit input terminal 703, relay unit output terminal 704, relay unit cable 800, and remote control input terminal 107. Here, let us say that the S/P switching signal output is Vref1 in the event of controlling the focus lens 106 with speed control, and Vref2 in the event of controlling the focus lens 106 with positional control. The switching signal determining means 108 determine that the input multiplex signals are level signals within the output range of the MF command signal generating means 401, switch the AF/MF switching means 104 to the B side, and in the event that the input S/P switching signal Vref2 determines that control of the focus lens 106 is to be made with positional control, and outputs a S/P switching command signal of positional control of the focus lens 106 to the MF driving control means 109. In the event that the S/P switching command signals indicate that the focus lens 106 is to be controlled by speed control, the MF driving control means 109 handle the MF command signals as speed control command signals, generate motor control signals for driving the motor 105 at a speed specified with the MF command signals, and drive the motor 105 to move the focus lens 106. On the other hand, in the event that the S/P switching command signals indicate that the focus lens 106 is to be controlled by positional control, the MF driving control means 109 handle the MF command signals as positional control command signals, generate motor control signals for driving the motor 105 to the position specified with the MF command signals, and drive the motor 105 to move the focus lens 106. Operating the MF command signal generating means 401 configured of switches and dials and the like causes MF command signals proportionate to the operations thereof to be output, and input to the MF driving control means 109 via the remote control output terminal 403, remote control cable 500, and remote control input terminal 107. The AF/MF switching means 104 are switched to the B side, so the motor 105 is driven by motor control signals from the MF driving control means 109, whereby the focus lens 106 is moved.

With the present embodiment, although a description has been made regarding application to an exchangeable lens, which is detachable from the camera unit, the embodiment may be similarly applied to an integrally formed camera unit having a non-detachable lens unit.

According to such a configuration, the advantages of the above-described embodiments can be had, i.e., the remote system with AF control is arranged so as to allow switching means for switching between whether to control the focus lens with AF control or with MF control to be provided to the side of the remote control unit which enables remote operations of the lens unit simply by replacing the lens unit with an article capable of handing AF control, thereby enabling including of switching means for switching between whether to control the focus lens with AF control or with MF control to be provided to the side of the remote control unit even though there are no available pins in the electric interface between the remote control unit and the optical device, further enabling MF control when under AF control, thereby making the remote system more useful.

Seventh Embodiment

Figure 11:
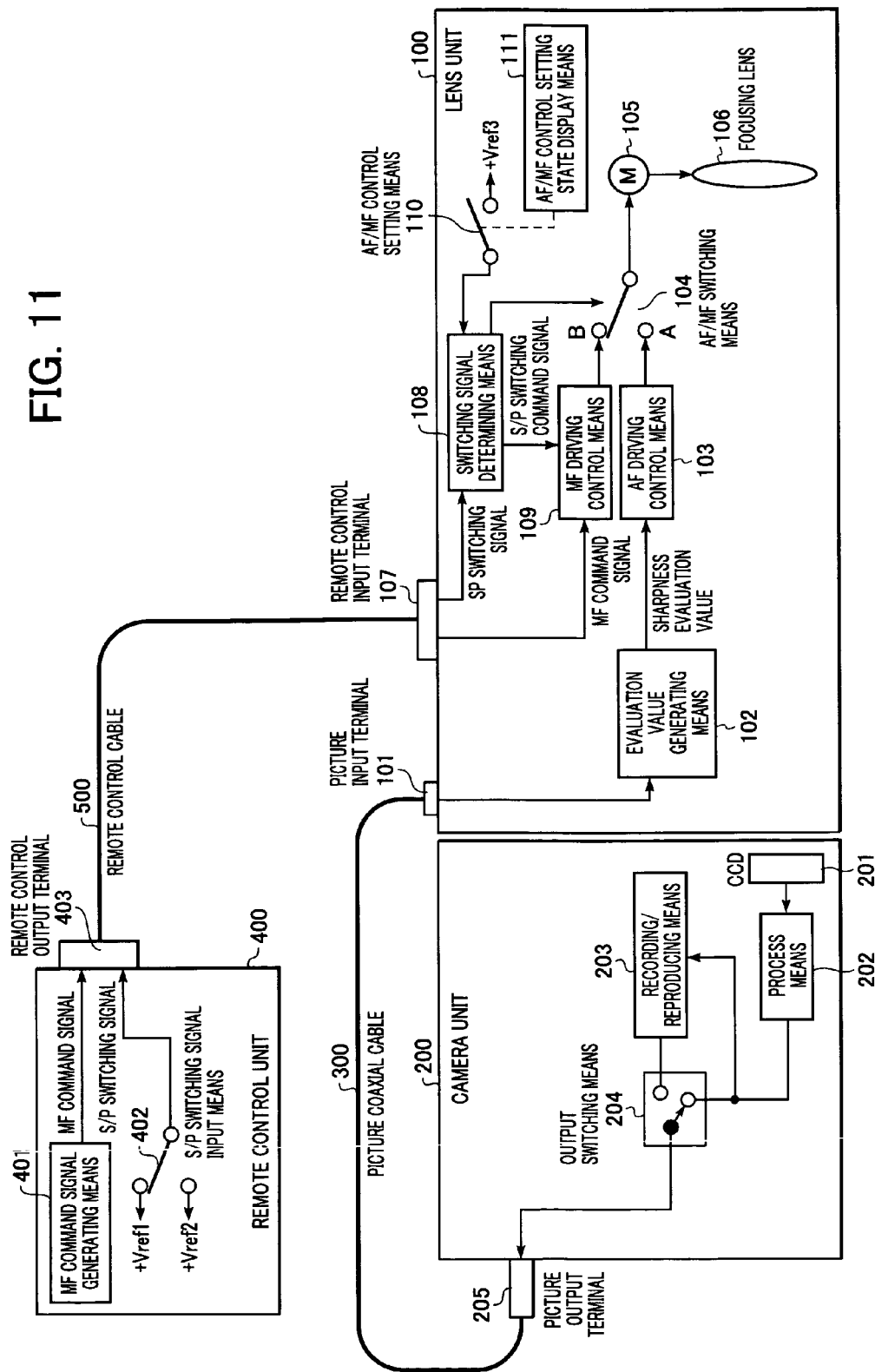
FIG. 11 is a block diagram of a seventh embodiment of the present invention.

A seventh embodiment of the present invention will now be described with reference to the drawings. FIG. 11 illustrates the configuration of an image-taking device to which the seventh embodiment of the present invention has been applied.

In FIG. 11, reference numeral 100 denotes an exchangeable lens unit, 200 denotes a camera unit, 300 denotes a picture coaxial cable, 400 denotes a remote control unit for supplying the lens unit 100 with control signals for controlling an unshown zoom lens unit, iris unit, and focus lens 106 within the lens unit 100, and with switching signals for switching between whether to control the unshown zoom lens unit, iris unit, and focus lens 106 with speed control or with positional control, and 500 denotes a remote control cable for connecting the remote control unit 400 with the lens unit 100.

In the lens unit 100, reference numeral 101 denotes a picture input terminal for inputting picture signals via a picture coaxial cable 300, 102 denotes evaluation value generating means for extracting a sharpness evaluation value from the picture signals input from the picture input terminal 101, and 103 denotes AF driving control means for generating motor control signals such that the sharpness evaluation value generated by the evaluation value generating means 102 is maximized. Reference numeral 104 denotes AF/MF switching means controlled by later-described switching signal determining means 108, for switching between whether to drive the later-described motor 105 with motor control signals from the AF driving control means 103 or with motor control signals from the later-described MF driving control means 109, 105 denotes a motor operated by motor control signals from the AF driving control means 103 or the later-described MF driving control means 109, and 106 denotes a focus lens which moves along the optical axis by being driven by the motor 105. Reference numeral 107 denotes a remote control input terminal for inputting MF command signals and S/P switching signals from the remote control unit 400 to the lens unit 100, 108 denotes switching signal determining means for determining whether signals from later-described control setting means 110 are AF control or MF control, and in the event of MF control whether speed control or positional control of the focus lens 106 is to be performed, outputting S/P switching command signals commanding whether to control the focus lens 106 with speed control or positional control and also switching the AF/MF switching means 104 according to whether the focus lens 106 is to be controlled with AF control or MF control. Reference numeral 109 denotes MF driving control means for generating motor control signals for driving the motor 105 with MF control signals to control the focus lens 106 with one or the other of speed control or positional control, based on S/P switching command signals from the switching signal determining means 108, 110 denotes AF/MF control setting means for setting whether to control the focus lens 106 with AF control or MF control, and 111 denotes AF/MF control setting state display means for displaying the setting state of the AF/MF control setting means 110.

In the camera 200, reference numeral 201 denotes a CCD, 202 denotes process means for converting the output signals of the CCD into a picture format such as NTSC signals or the like, and 203 denotes recording/reproducing means for recording the picture signals, which are the output of the process means 202, on a recording medium, and reproducing the pictures recorded therein. Reference numeral 204 denotes output switching means for selecting one of the process means 202 and recording/reproducing means 203 for output of the picture signals, and 205 denotes a picture output terminal for outputting picture signals which are the output of the output switching means 204.

In the remote control unit 400, reference numeral 401 denotes MF command signal generating means configured of switches and dials for generating MF command signals, 402 denotes S/P switching signal input means for switching between whether the focus lens 106 is to be controlled with speed control or positional control when under MF control, and 403 denotes a remote control output terminal for outputting the MF command signals and S/P switching signals from the remote control unit 400 to the lens unit 100.

First, the actions of the above-described configuration in the event that the settings of the AF/MF control setting means 110 are to control the focus lens 106 with AF control, will be described. The optical flux through the focus lens 106 is imaged on the imaging face of the CCD 201, subjected to photoelectric conversion by the CCD 201, and a held sample is input to the process means 202. At the process means 202, the input signals are converted into a picture format such as NTSC signals or the like, and output to the output switching means 204 and recording/reproducing means 203. In a recording state, the output switching means 204 output the output for the process means 202 to the picture output terminal 205, and the recording/reproducing means 203 record the output of the process means 202 to the recording medium. In a reproducing state, the recording/reproducing means 203 reproduce the picture signals recorded in the recording medium, and upon the picture signals being reproduced in a stable manner, the output switching means 204 output the picture signals of the recording/reproducing means 203 to the picture output terminal 205.

Picture signals are input to the picture input terminal 101 of the lens 100 from the picture output terminal 205 of the camera 200 via the picture coaxial cable 300. The evaluation value generating means 102 generates sharpness evaluation values for the picture signals input to the picture input terminal 101, relating to the frequency component of the picture being obtained by filter processing or the like and generated in increments of vertical synchronization cycles of the picture signals, and output the sharpness evaluation values to the AF driving control means 103.

On the other hand, the AF/MF control setting means 110 is set to drive the focus lens 106 with AF control, so Vref3 is input to the switching signal determining means 108 and the AF/MF control setting state display means 111 display AF control. The signal from the AF/MF control setting means 110 is Vref3, so the switching signal determining means 108 switch the AF/MF switching means 104 to the A side so as to control the focus lens 106 with AF control. Accordingly, the motor 105 is driven by motor control signals from the AF driving control means 103, and thus the focus lens 106 is moved.

Next, description will be made regarding the actions in a case wherein the focus lens 106 has been set to being driven by MF control by the AF/MF control setting means 110. Operating the MF command signal generating means 401 configured of switches and dials and the like causes MF command signals proportionate to the operations thereof to be output, and input to the MF driving control means 109 via the remote control output terminal 403, remote control cable 500, and remote control input terminal 107.

On the other hand, at the S/P switching signal input means 402, S/P switching signals for switching between whether to control the focus lens 106 with speed control or with positional control are input to the switching signal determining means 108 via the remote control output terminal 403, remote control cable 500, and remote control input terminal 107. Also, the AF/MF control setting means 110 are set to control the focus lens 106 with MF control, so Vref3 is not input to the switching signal determining means 108, and the AF/MF control setting state display means 111 display MF control. At the switching signal determining means 108, Vref3 is not input from the AF/MF control setting means 110, so the AF/MF switching means 104 are switched to the B side so as to control the focus lens 106 with MF control. In the event that the input S/P switching signal is Vref1, determination is made to control the focus lens 106 with speed control, and an S/P switching command signal for controlling the focus lens 106 with speed control is output to the MF driving control means 109, and in the event that the input S/P switching signal is Vref2, determination is made to control the focus lens 106 with positional control, and an S/P switching command signal for controlling the focus lens 106 with positional control is output to the MF driving control means 109. In the event that the S/P switching command signals indicate that the focus lens 106 is to be controlled by speed control, the MF driving control means 109 handle the MF command signals as speed control command signals, generate motor control signals for driving the motor 105 at a speed specified with the MF command signals, and drive the motor 105 to move the focus lens 106. On the other hand, in the event that the S/P switching command signals indicate that the focus lens 106 is to be controlled by positional control, the MF driving control means 109 handle the MF command signals as positional control command signals, generate motor control signals for driving the motor 105 to the position specified with the MF command signals, and drive the motor 105 to move the focus lens 106.

With the present embodiment, although a description has been made regarding application to an exchangeable lens, which is detachable from the camera unit, the embodiment may be similarly applied to an integrally formed camera unit having a non-detachable lens unit.

According to such a configuration, the remote system with AF control is arranged so as to allow switching means for switching between whether to control the focus lens 106 with AF control or with MF control to be provided on the lens unit, even though there are no available pins in the electric interface between the remote control unit and the optical device, thereby making the remote system more useful.

Eighth Embodiment

While the seventh embodiment has been described as an arrangement wherein whether to perform AF control or MF control of the focus lens is switched by the settings of the AF/MF control setting means, an optical device with a configuration comprising command/switching signal determining means for switching the control of the focus lens to MF control upon the MF command signals generating means being operated even though the AF/MF control setting means are set to AF control for controlling the focus lens will be described as an eighth embodiment.

Figure 12:
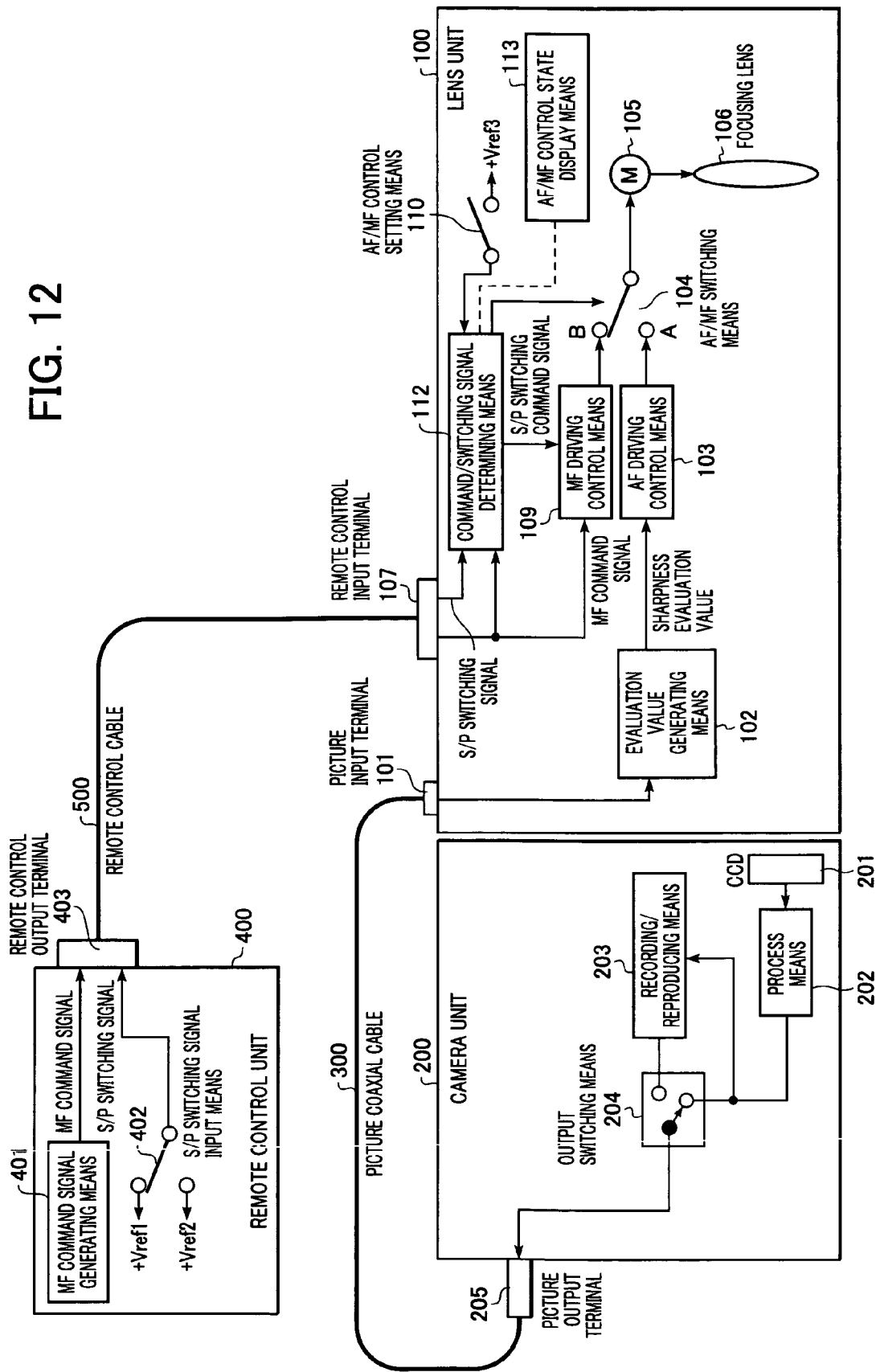
FIG. 12 is a block diagram illustrating eighth and ninth embodiments of the present invention.
Figure 13:
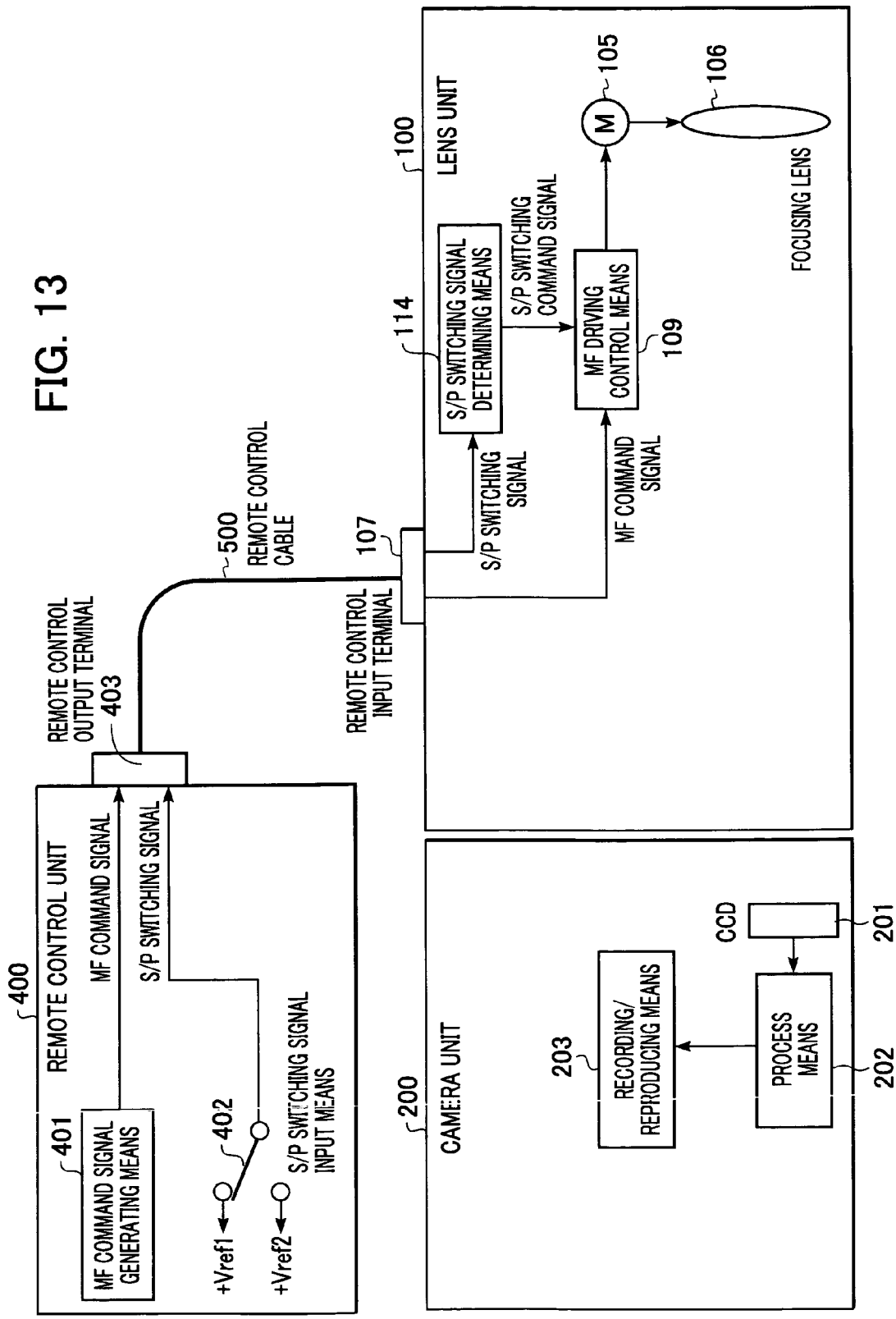
FIG. 13 is a block diagram of a conventional example.

The eighth embodiment of the present invention will now be described with reference to the drawings. FIG. 12 illustrates the configuration of an optical device to which the eighth embodiment of the present invention has been applied. The components denoted by the reference numerals 100 through 107, 109, 110, 200 through 205, 300, 400 through 403, and 500 have already been described above, so description thereof will be omitted.

Reference numeral 112 denotes command/switching signal determining means for determining whether a signal from the AF/MF control setting means 110 is for AF control or MF control, and further in the event that the signal is for AF control, determining whether or not the MF command signal generating means 401 have been operated, and in the event that the signal is for MF control, determining whether to control the focus lens 106 with speed control or with positional control, and further yet outputting S/P switching command signals to the MF driving control means 109 indicating whether to control the focus lens 106 with speed control or with positional control, and switching the AF/MF switching means 104 according to whether the focus lens 106 is to be controlled with AF control or with MF control. Reference numeral 113 denotes AF/MF control state display means for displaying whether the focus lens 106 is being controlled with AF control or with MF control.

With the above-described configuration, the actions in the event that the settings of the AF/MF control setting means 110 are to control the focus lens 106 with AF control, and the MF command signal generating means 401 are not operated, will be described.

The optical flux through the focus lens 106 is imaged on the imaging face of the CCD 201, subjected to photoelectric conversion by the CCD 201, and a held sample is input to process means 202. At the process means 202, the input signals are converted into a picture format such as NTSC signals or the like, and output to the output switching means 204 and recording/reproducing means 203.

In a recording state, the output switching means 204 provides the output to the process means 202 to the picture output terminal 205, and the recording/reproducing means 203 record the output of the process means 202 to the recording medium. In a reproducing state, the recording/reproducing means 203 reproduce the picture signals recorded in the recording medium, and upon the picture signals being reproduced in a stable manner, the output switching means 204 output the picture signals of the recording/reproducing means 203 to the picture output terminal 205.

Picture signals are input to the picture input terminal 101 of the lens 100 from the picture output terminal 205 of the camera 200 via the picture coaxial cable 300. The evaluation value generating means 102 generates sharpness evaluation values for the picture signals input to the picture input terminal 101, relating to the frequency component of the picture being obtained by filter processing or the like and generated in increments of vertical synchronization cycles of the picture signals, and output the sharpness evaluation values to the AF driving control means 103.

On the other hand, the AF/MF control setting means 110 is set to drive the focus lens 106 with AF control, so Vref3 is input to the command/switching signal determining means 112. The signal from the AF/MF control setting means 110 is Vref3, so the command/switching signal determining means 112 switch the AF/MF switching means 104 to the A side so as to control the focus lens 106 with AF control and the AF/MF control state display means 113 display AF control. Accordingly, the motor 105 is driven by motor control signals from the AF driving control means 103, and thus the focus lens 106 is moved.

Next, the actions in a case wherein the MF command signal generating means 401 are operated in the above state will be described. In the event that the MF command signal generating means 401 are operated while the focus lens 106 is being controlled with AF control, the command/switching signal determining means 112 determine that the MF command signal from the MF command signal generating means 401 has changed, the AF/MF switching means 104 are switched to the B side, and MF control is displayed at the AF/MF control state display means 113.

At the same time, in the event that the S/P switching setting signal input from the S/P switching signal input means 402 via the remote control output terminal 403, remote control cable 500, and remote control input terminal 107 is Vref1, the command/switching signal determining means 112 output S/P switching command signals to the MF driving control means 109 so that control of the focus lens 106 is performed with speed control, and in the event that the S/P switching setting signal is Vref2, with positional control.

At the MF driving control means 109, in the event that the S/P switching command signals indicate that the focus lens 106 is to be controlled by speed control, the MF driving control means 109 handle the MF command signals as speed control command signals, generate motor control signals for driving the motor 105 at a speed specified with the MF command signals, and drive the motor 105 to move the focus lens 106. On the other hand, in the event that the S/P switching command signals indicate that the focus lens 106 is to be controlled by positional control, the MF driving control means 109 handle the MF command signals as positional control command signals, generate motor control signals for driving the motor 105 to the position specified with the MF command signals, and drive the motor 105 to move the focus lens 106.

Finally, a description will be made regarding the actions in a case wherein the focus lens 106 has been set to being driven by MF control by the AF/MF control setting means 110. Operating the MF command signal generating means 401 configured of switches and dials and the like causes MF command signals proportionate to the operations thereof to be output, and input to the input to the MF driving control means 109 via the remote control output terminal 403, remote control cable 500, and remote control input terminal 107.

On the other hand, at the S/P switching signal input means 402, S/P switching signals for switching between whether to control the focus lens 106 with speed control or with positional control are input to the command/switching signal determining means 112 via the remote control output terminal 403, remote control cable 500, and remote control input terminal 107. Also, the AF/MF control setting means 110 are set to control the focus lens 106 with MF control, so Vref3 is not input to the command/switching signal determining means 112.

At the command/switching signal determining means 112, Vref3 is not input from the AF/MF control setting means 110, so the AF/MF switching means 104 are switched to the B side so as to control the focus lens 106 with MF control and the AF/MF control state display means 113 display MF control. In the event that the input S/P switching signal is Vref1, determination is made to control the focus lens 106 with speed control, and an S/P switching command signal for controlling the focus lens 106 with speed control is output to the MF driving control means 109, and in the event that the input S/P switching signal is Vref2, determination is made to control the focus lens 106 with positional control, and an S/P switching command signal for controlling the focus lens 106 with positional control is output to the MF driving control means 109.

In the event that the S/P switching command signals indicate that the focus lens 106 is to be controlled by speed control, the MF driving control means 109 handle the MF command signals as speed control command signals, generate motor control signals for driving the motor 105 at a speed specified with the MF command signals, and drive the motor 105 to move the focus lens 106. On the other hand, in the event that the S/P switching command signals indicate that the focus lens 106 is to be controlled by positional control, the MF driving control means 109 handle the MF command signals as positional control command signals, generate motor control signals for driving the motor 105 to the position specified with the MF command signals, and drive the motor 105 to move the focus lens 106.

With the present embodiment, although a description has been made regarding application to an exchangeable lens, which is detachable from the camera unit, the embodiment may be similarly applied to an integrally formed camera unit having a non-detachable lens unit.

Also, with the present embodiment, although a description has been made regarding an arrangement wherein the AF/MF control state display means 113 display whether the focus lens 106 is being controlled with AF control or with MF control, an arrangement may be made wherein the AF/MF control state display means 113 display whether the AF/MF control setting means 110 are set to AF control or to MF control.

According to such a configuration, the advantages of the preceding embodiment can be had, i.e., the remote system with AF control is arranged so as to allow switching means for switching between whether to control the focus lens with AF control or with MF control to be provided on the lens unit, even though there are no available pins in the electric interface between the remote control unit and the optical device, further enabling MF control when under AF control, thereby making the remote system more useful.

Ninth Embodiment

The eighth embodiment has been described as an arrangement wherein, even in the event that the settings of the AF/MF control setting means are to control the focus lens with AF control, operating the MF command signal generating means switches the control of the focus lens to MF control by setting the S/P switching signal input means. A ninth embodiment will be descried as an optical device wherein in the event that the MF command signal generating means are operated under settings of the AF/MF control setting means to control the focus lens with AF control, the control of the focus lens to MF control is set to MF control only in the event that the setting of the S/P switching signal input means are to control the focus lens with speed control.

The ninth embodiment of the present invention will now be described with reference to the drawings. FIG. 12 illustrates the configuration of an optical device to which the ninth embodiment of the present invention has been applied. The components denoted by the reference numerals 100 through 107, 109, 110, 112, 113, 200 through 205, 300, 400 through 403, and 500 have already been described above, so description thereof will be omitted.

Also, the actions in the event that the settings of the AF/MF control setting means 110 are to control the focus lens 106 with AF control, and the MF command signal generating means 401 are not operated, and the actions in the event that the settings of the AF/MF control setting means 110 are to control the focus lens 106 with MF control, have been described in the eighth embodiment, and accordingly description thereof will be omitted here. Instead, the actions of the above configuration in the event that the settings of the AF/MF control setting means 110 are to control the focus lens 106 with AF control, and the MF command signal generating means 401 are operated, will be described.

In a case wherein the MF command signal generating means 401 are operated while the focus lens 106 is being controlled with AF control, and in the event that the command/switching signal determining means 112 determines that the MF command signal from the MF command signal generating means 401 has changed and the S/P switching signal input from the S/P switching signal input means 402 is Vref1, the AF/MF switching means 104 are switched to the B side, and MF control is displayed at the AF/MF control state display means 113.

In the event that the S/P switching signal input from the S/P switching signal input means 402 is Vref3, or the MF command signal generating means 401 have not been operated, the AF/MF switching means 104 go to the A side. At the same time, in the event that the S/P switching signal input from the S/P switching signal input means 402 via the remote control output terminal 403, remote control cable 500, and remote control input terminal 107, is Vref1, the command/switching signal determining means 112 output a S/P switching command signal to the MF driving control means 109 to control the focus lens 106 with speed control. At the MF driving control means 109, in the event that the S/P switching command signals indicate that the focus lens 106 is to be controlled by speed control, the MF driving control means 109 handle the MF command signals as speed control command signals, generate motor control signals for driving the motor 105 at a speed specified with the MF command signals, and drive the motor 105 to move the focus lens 106. In this case, the focus lens 106 is being controlled with MF control, so the AF/MF control state display means 113 display MF control.

With the present embodiment, although a description has been made regarding application to an exchangeable lens, which is detachable from the camera unit, the embodiment may be similarly applied to an integrally formed camera unit having a non-detachable lens unit.

Also, with the present embodiment, although a description has been made regarding an arrangement wherein the AF/MF control state display means 113 display whether the focus lens 106 is being controlled with AF control or with MF control, an arrangement may be made wherein the AF/MF control state display means 113 display whether the AF/MF control setting means 110 are set to AF control or to MF control.

According to such a configuration, the advantages of the preceding embodiments can be had, i.e., the remote system with AF control is arranged so as to allow switching means for switching control of the focus lens between AF control and MF control to be provided on the lens unit, even though there are no available pins in the electric interface between the remote control unit and the optical device, further enabling MF control when under AF control, thereby making the remote system more useful.

While the present invention has been described with reference to present embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A relay unit comprising:
an input terminal communicably coupled to a remote control unit, for receiving signals from said remote control unit;
an output terminal communicably coupled to an optical unit having a focus lens, the output terminal for providing said signals from the remote control unit to the optical unit; and
first switching signal input means for controlling the focus lens by switching between automatic focal point detection focusing and remote commands from said remote control unit,
wherein said input terminal is communicably coupled to second switching signal input means for controlling the focus lens by switching between speed control and positional control of the focus lens, and
wherein output signals from said first switching signal input means are multiplexed with switching signals output from said second switching signal input means.

2. A relay unit comprising:
an input terminal communicably coupled to a remote control unit, for receiving signals from said remote control unit;
an output terminal communicably coupled to an optical unit having a focus lens, the output terminal for providing said signals from the remote control unit to the optical unit; and
first switching signal input means for controlling the focus lens by switching between automatic focal point detection focusing and remote commands from said remote control unit,
wherein said input terminal is communicably coupled to first remote command generating means for performing remote operations to control the focus lens, and
wherein output signals from said first switching signal input means are multiplexed with remote command control signals output from said first remote command generating means.

3. A focal point detection system comprising:
an optical unit having a focus lens;
a remote control unit for remotely controlling said focus lens in said optical unit; and
a relay unit including an input terminal communicably coupled between said remote control unit and said optical unit, for receiving signals from said remote control unit, the relay unit including an output terminal communicably coupled to the optical unit for providing said signals from the remote control unit to the optical unit, the relay unit including first switching signal input means for controlling the focus lens by switching between automatic focal point detection focusing and remote commands from said remote control unit, wherein said input terminal is communicably coupled to second switching signal input means for controlling the focus lens by switching between speed control and positional control of the focus lens, and wherein output signals from said first switching signal input means are multiplexed with switching signals output from said second switching signal input means.

4. A focal point detection system comprising:
an optical unit having a focus lens;
a remote control unit for remotely controlling said focus lens in said optical unit; and
a relay unit including an input terminal communicably coupled between said remote control unit and said optical unit, for receiving signals from said remote control unit, the relay unit including an output terminal communicably coupled to the optical unit for providing said signals from the remote control unit to the optical unit, the relay unit including first switching signal input means for controlling the focus lens by switching between automatic focal point detection focusing and remote commands from said remote control unit, wherein said input terminal is communicably coupled to first remote command generating means for performing remote operations to control the focus lens, and wherein output signals from said first switching signal input means are multiplexed with remote command control signals output from said first remote command generating means.

* * * * *